United States Patent
Katayama

(10) Patent No.: US 8,253,685 B2
(45) Date of Patent: *Aug. 28, 2012

(54) HEAD MOUNT DISPLAY

(75) Inventor: Shingo Katayama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 378 days.

This patent is subject to a terminal disclaimer.

(21) Appl. No.: 12/654,297

(22) Filed: Dec. 16, 2009

(65) Prior Publication Data

US 2010/0156787 A1    Jun. 24, 2010

(30) Foreign Application Priority Data

Dec. 19, 2008  (JP) ................................. 2008-324645

(51) Int. Cl.
- *G09G 5/00* (2006.01)
- *G09G 5/08* (2006.01)
- *G06F 3/033* (2006.01)
- *G02B 27/14* (2006.01)

(52) U.S. Cl. ............. 345/157; 345/8; 345/156; 359/630

(58) Field of Classification Search ................ 345/8, 81, 345/156; 359/630

See application file for complete search history.

(56) References Cited

U.S. PATENT DOCUMENTS

| | | |
|---|---|---|
| 2002/0126026 A1 | 9/2002 | Lee et al. |
| 2002/0126066 A1 * | 9/2002 | Yasukawa et al. ................ 345/8 |
| 2002/0140667 A1 * | 10/2002 | Horiki ........................... 345/156 |
| 2005/0264527 A1 * | 12/2005 | Lin ................................. 345/156 |
| 2007/0008624 A1 * | 1/2007 | Hirayama ...................... 359/630 |

FOREIGN PATENT DOCUMENTS

| | | |
|---|---|---|
| JP | A-7-271504 | 10/1995 |
| JP | A-7-281818 | 10/1995 |
| JP | A-2000-242394 | 9/2000 |
| JP | A-2002-278673 | 9/2002 |
| JP | A-2005-301583 | 10/2005 |

* cited by examiner

*Primary Examiner* — Quan-Zhen Wang
*Assistant Examiner* — Lin Li
(74) *Attorney, Agent, or Firm* — Oliff & Berridge, PLC

(57) ABSTRACT

A HMD images at least a portion of a field of view of a user, and detects a user's hand based on a result of an analysis of an imaged image. The HMD performs a control of defining and displaying a position of an operation part of a virtual operation panel based on a position of the detected user's hand. A position associated with the hand observed by the user is set as a display position of the virtual operation panel which tracks the position of the user's hand. The HMD detects an operation conducted by a user's finger, determines whether or not the virtual operation panel is operated based on the operation conducted by the detected finger, and performs a control corresponding to an operation position of the virtual operation panel when it is determined that the virtual operation panel is operated.

11 Claims, 15 Drawing Sheets

Fig.6

SIZE TABLE

| SIZE OF HAND | A~B | B~C | C~D | D~E |
|---|---|---|---|---|
| K/B SIZE | XL | L | M | S |

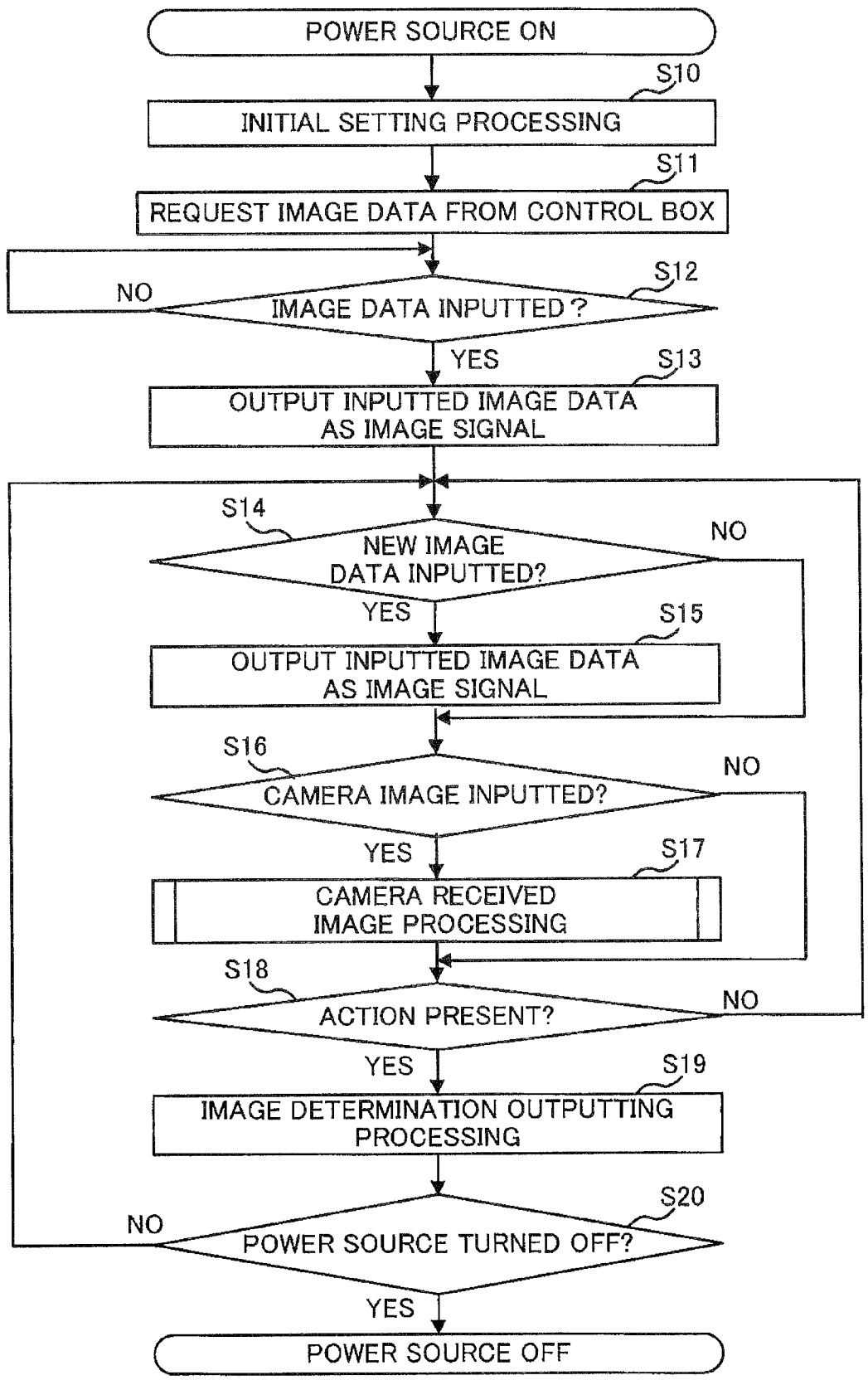

HEAD MOUNT DISPLAY

CROSS-REFERENCE TO RELATED APPLICATIONS

This application is based on and claims the benefit of priority from Japanese Patent Application No. 2008-324645 filed on Dec. 19, 2008, the entire contents of which are incorporated herein by reference.

BACKGROUND

1. Field

The present invention relates to a head mount display. The present invention more particularly relates to a see-through type head mount display provided with a display unit which allows transmission of an ambient light therethrough and projects an image light corresponding to image data to an eye of a user thus allowing the user to observe an image corresponding to the image light.

2. Description of the Related Art

Conventionally, there has been known an information processing device which includes a memory unit for storing various content data such as moving image files, still image files and document files, and a reproducing unit which reproduces the content data stored in the memory unit.

A typical example of such an information processing device is a personal computer. In general, the personal computer is constituted of a computer body provided with a memory unit, a reproducing unit and the like, a mechanical operating unit such as a keyboard or a mouse which a user operates to allow the computer body to perform predetermined operations, a display which displays the content data reproduced by the reproducing unit as an image and the like.

As the display which displays the image data, a display device which is used in a state where the display device is placed on a table such as a CRT (Cathode Ray Tube) display or a liquid crystal display has been known in general. However, there has been also developed a head mount display (referred to as "HMD" hereinafter) which allows a user to observe an image in a state where the user mounts the HMD on his/her head using a liquid crystal display element as an image display device.

With respect to such an HMD, there has been known a see-through type HMD which also allows the transmission of an ambient light. This HMD is configured to allow a user to observe an external field while observing the content data even in the midst of display of the content data as an image.

With respect to a conventional display, there has been known a display in which a virtual operation panel is displayed in a fixed manner. For example, and an inputting operation corresponding to an operation position on the virtual operation panel is performed by detecting a position or an operation conducted by a finger of a user on the displayed virtual operation panel.

SUMMARY

However, in the conventional technique, the display position of the virtual operation panel for performing predetermined operation inputting is fixed. Accordingly, if this technique is applied to the see-through type HMD, when a user moves his head on which the HMD is put, a position where the virtual operation panel is observed (display position) is also moved. Accordingly, there exists a possibility that the display position of the virtual operation panel and the operation position of the user (position of a finger of the user) are displaced from each other. This positional displacement leads to erroneous inputting.

Usually, the virtual operation panel is constituted of a plurality of virtual keys to which different inputs are allocated, and the plurality of virtual keys is arranged close to each other. Accordingly, even when the user slightly moves his head, the position of the key is moved. Due to such movement of the key, the user would operate an operation key different from a desired operation key thus giving rise to a possibility of frequent occurrence of erroneous inputting. To prevent the occurrence of such erroneous inputting, it may be possible to urge the user to fix his head during an inputting operation using operation keys. However, such an inputting operation would cause the user to experience uncomfortable feelings.

The present invention has been made under such circumstances, and it is an object of the present invention to provide a head mount display which can prevent the displacement between a display position of a virtual operation panel and an operation position of a user.

To achieve the above-mentioned object, according to one aspect of the present invention, there is provided a see-through type head mount display which includes: a display unit; an imaging unit; an image analyzing unit; a hand detection unit; a position definition unit; a display control unit; an operation detection unit; an operation determination unit; and an operation control unit. The display unit is configured to transmit an ambient light therethrough, and configured to project an image light corresponding to image data onto an eye of a user in order to allow the user to observe an image corresponding to the image light. The imaging unit is configured to image at least a portion of a field of view of the user. The image analyzing unit is configured to analyze an image imaged by the imaging unit. The hand detection unit is configured to detect a hand of the user based on a result of an analysis performed by the image analyzing unit. The position definition unit is configured to define a display position to display a virtual operation panel such that the virtual operation panel tracks the hand of the user which is observed by the user through the display unit. The display control unit is configured to control the display unit such that the display unit displays the virtual operation panel at the display position. The operation detection unit is configured to detect an operation conducted by a finger of the user.

The operation determination unit is configured to determine whether or not the virtual operation panel is operated based on the operation conducted by the finger detected by the operation detection unit. The operation control unit is configured to perform a control corresponding to an operation position on the virtual operation panel when the operation determination unit determines that the virtual operation panel is operated.

Here, the position definition unit defines a first specified portion of the hand of the user as a reference position based on a position of the hand of the user detected by the hand detection unit, and defines a position which always assumes a predetermined positional relationship with the reference position and which is within a display area displayed by the display unit as the display position.

BRIEF DESCRIPTION OF THE DRAWINGS

FIG. 6 is an explanatory view showing a size table in the HMD according to one embodiment of the present invention;

FIG. 8 is a flow chart showing one example of processing which is executed in performing a control of the HMD;

DETAILED DESCRIPTION

A head mount display (also referred to as "HMD" hereinafter) 1 according to one embodiment of the present invention is explained specifically in conjunction with drawings.

[Overall Constitution of HMD]

Figure 1:
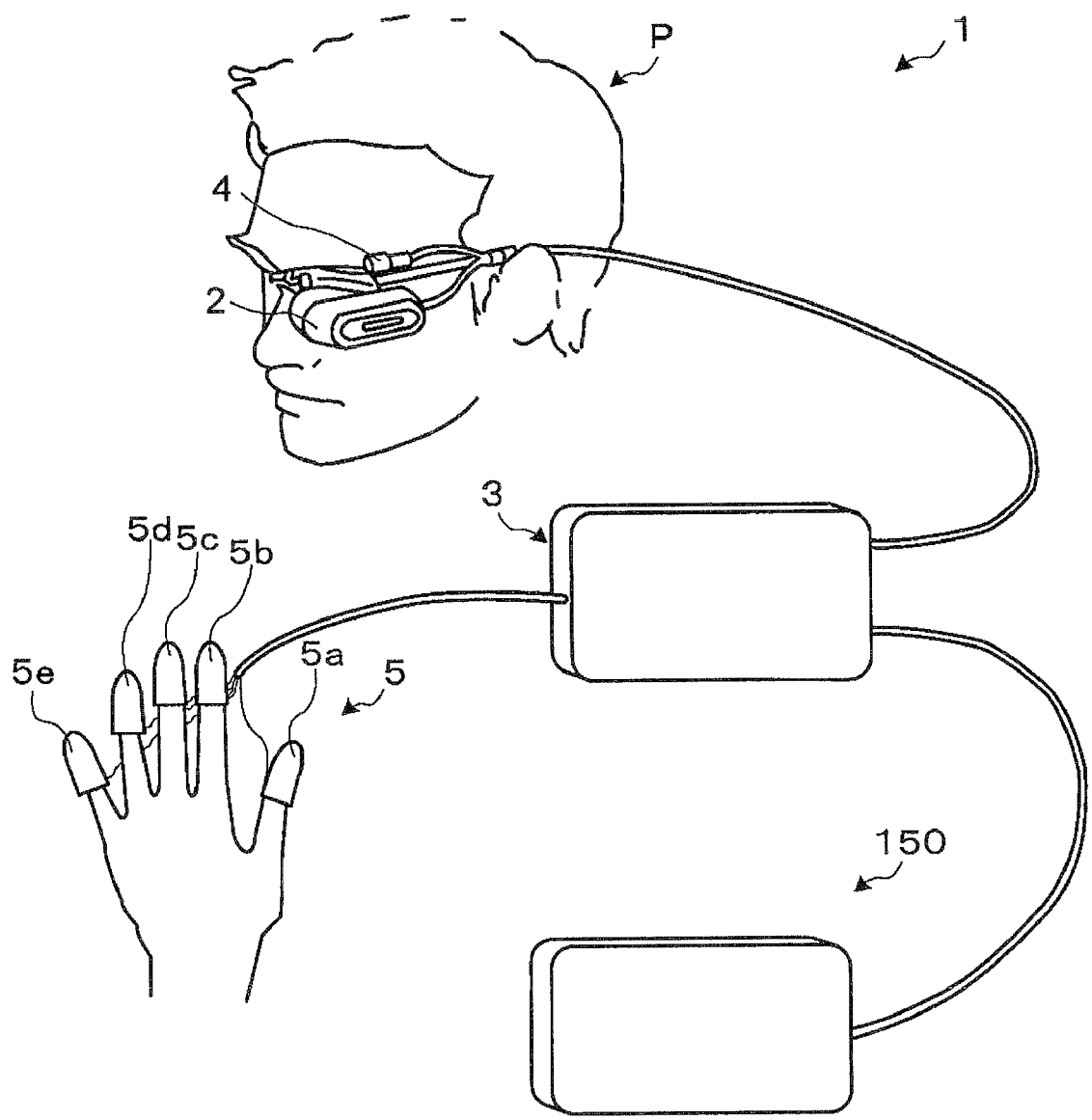
FIG. 1 is an explanatory view showing an HMD according to one embodiment of the present invention.

As shown in FIG. 1, the HMD 1 according to this embodiment includes an HMD body 2 which a user P mounts on his head, a controller 3, a CCD (Charge Coupled Device) camera 4, an acceleration sensor 5 which the user P mounts on his finger, and a control box 150 which is communicably connected with the controller 3.

The HMD body 2 performs a display which allows the user P to observe various content data such as moving image files, still image files and document files and a virtual operation panel as images in a state where the user P mounts the HMD body 2 on his head. The HMD body 2 is a retinal scanning display which allows the user P to observe an image corresponding to content data (hereinafter simply referred to as "content") by scanning light whose intensity is modulated corresponding to respective colors (R, G, B) two-dimensionally on a retina of the user P.

In this manner, the retinal scanning display is adopted as the HMD body 2 in the HMD of this embodiment. As another example of the HMD body 2, it may be possible to adopt a display in which light passes through or is reflected on an LCD (liquid crystal display) to form an image light and the image light is projected on an eye Y of the user P thus allowing the user P to observe the content.

The HMD body 2 is configured to, even in the midst of display of the content, allow the user P to observe an external field within a field of view of the user P except for a region where the content is displayed.

Figure 2:
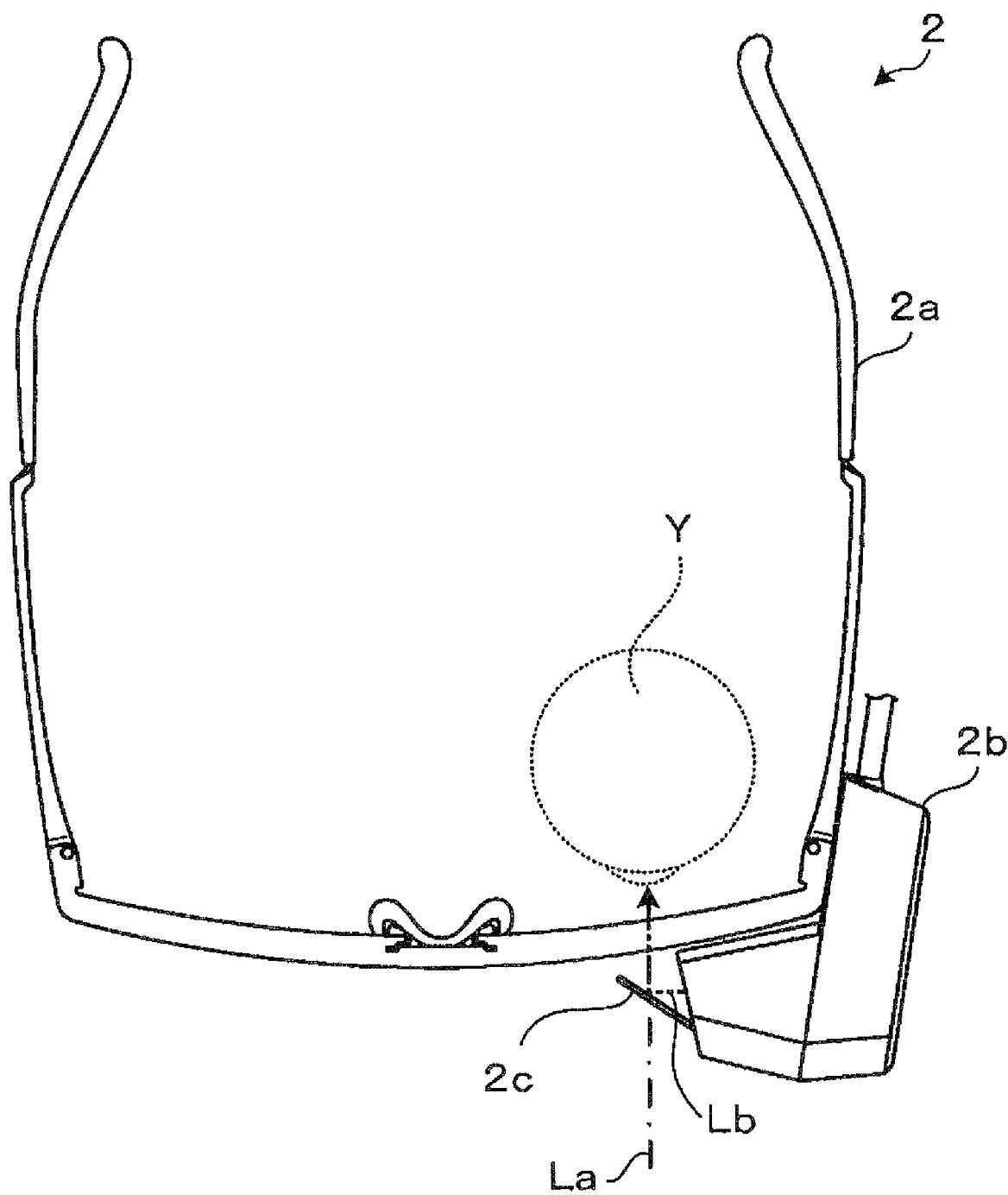
FIG. 2 is a view showing the appearance of an HMD body according to one embodiment of the present invention.

The HMD body 2 includes, as shown in FIG. 2, a support member 2a having an approximately eyeglass shape, and an image forming part 2b which forms an image to be recognized by a user. The image forming part 2b includes a half mirror 2c in front of an eye of the user P. An ambient light La passes through the half mirror 2c and is incident on the eye Y of the user P, and an image light Lb corresponding to content data is reflected on the half mirror 2c and is incident on the eye Y of the user P. In this manner, the HMD 1 constitutes a see-through type HMD which projects the image light corresponding to the content data on the eye Y of the user P while allowing the ambient light La to pass therethrough.

The controller 3 mainly performs processing for supplying image signals to the HMD body 2. The controller 3 is communicably connected with the HMD body 2, the CCD camera 4, the acceleration sensor 5, the control box 150 and the like. A control part 10 which controls the whole HMD 1 (see FIG. 5) and the like are built in the controller 3.

The CCD camera 4 is configured to sample at least a portion of an image in field of view of the user P. That is, the CCD camera 4 functions as an imaging unit 201 (see FIG. 7) which images at least a display area 6 (see FIG. 3 and FIG. 4) within a field of view of the user P.

Further, as shown in FIG. 1, the acceleration sensor 5 is constituted of a plurality of, e.g., five, acceleration sensors 5a to 5e which can be mounted on respective fingers of the user P. The acceleration sensor 5 functions as an operation detection unit which detects operations caused by fingers of the user P.

Figure 3:
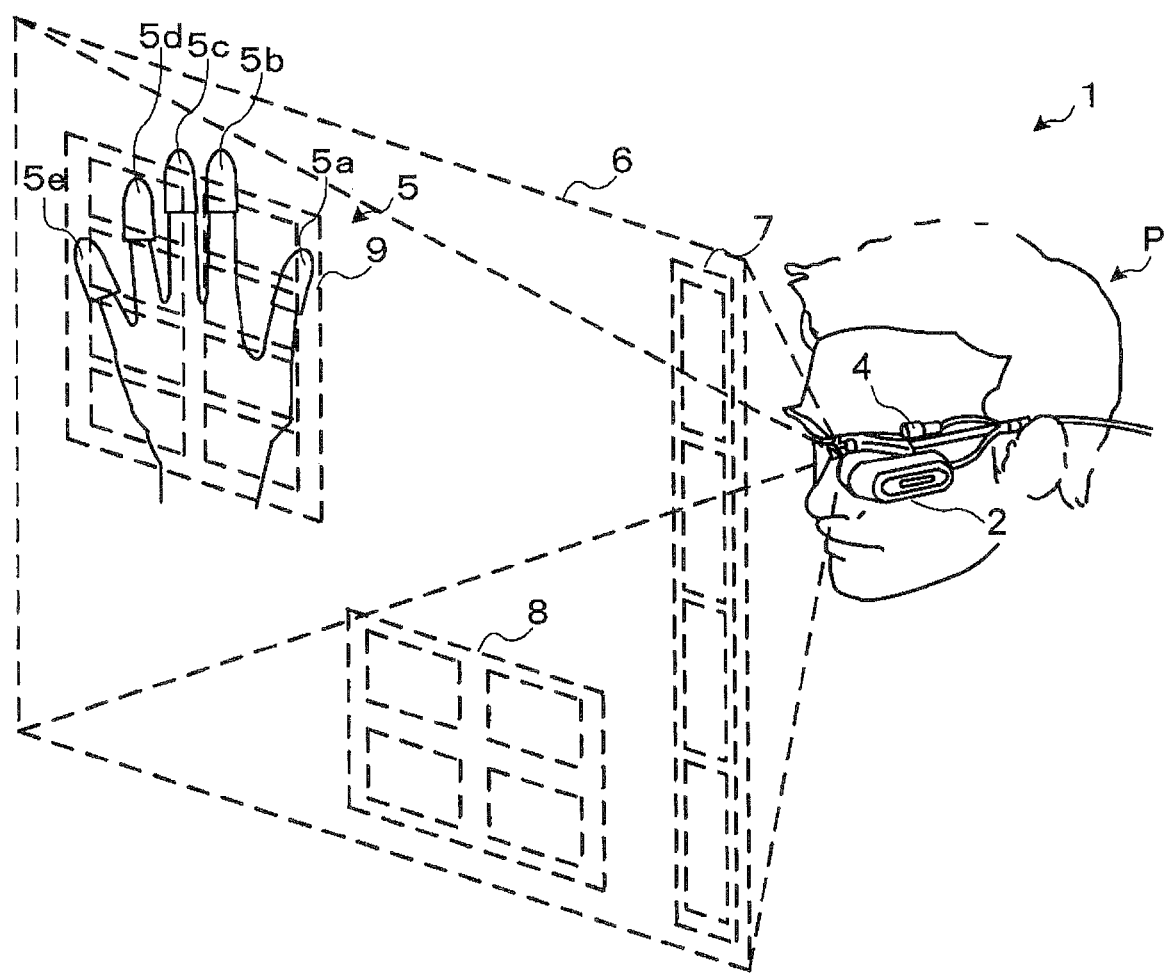
FIG. 3 is an explanatory view showing the HMD according to one embodiment of the present invention.

In the HMD 1, as shown in FIG. 3, the display area 6 is set in at least a portion of the field of view of the user P. The user P can observe an image in the display area 6 within the field of view of the user P. Particularly, virtual operation panels are displayed in the display area 6. The user P can perform operations with respect to these virtual operation panels. Further, the HMD 1 is a see-through type HMD and hence, the user P can observe these virtual operation panels while observing an external field.

In this embodiment, as shown in FIG. 3, the explanation is made with respect to an example which adopts, as the virtual operation panels, a virtual menu bar 7 which is displayed at a fixed position in the display area 6 and tracking virtual keyboards 8, 9 which are movable while tracking a hand of the user P.

A key operation of the virtual menu bar 7 or the tracking virtual keyboards 8, 9 is made by the user P, and such a key operation is detected based on an image imaged by the CCD camera 4 and acceleration information transmitted from the acceleration sensor 5. To be more specific, the controller 3 recognizes positions of a hand and fingers of the user P based on the image imaged by the CCD camera 4 and determines which finger is moved based on acceleration information transmitted from the acceleration sensor 5.

Then, the controller 3 recognizes that a key of the virtual operation panel disposed at a position of the moved finger is operated by the user P.

[Display Image]

Figure 4:
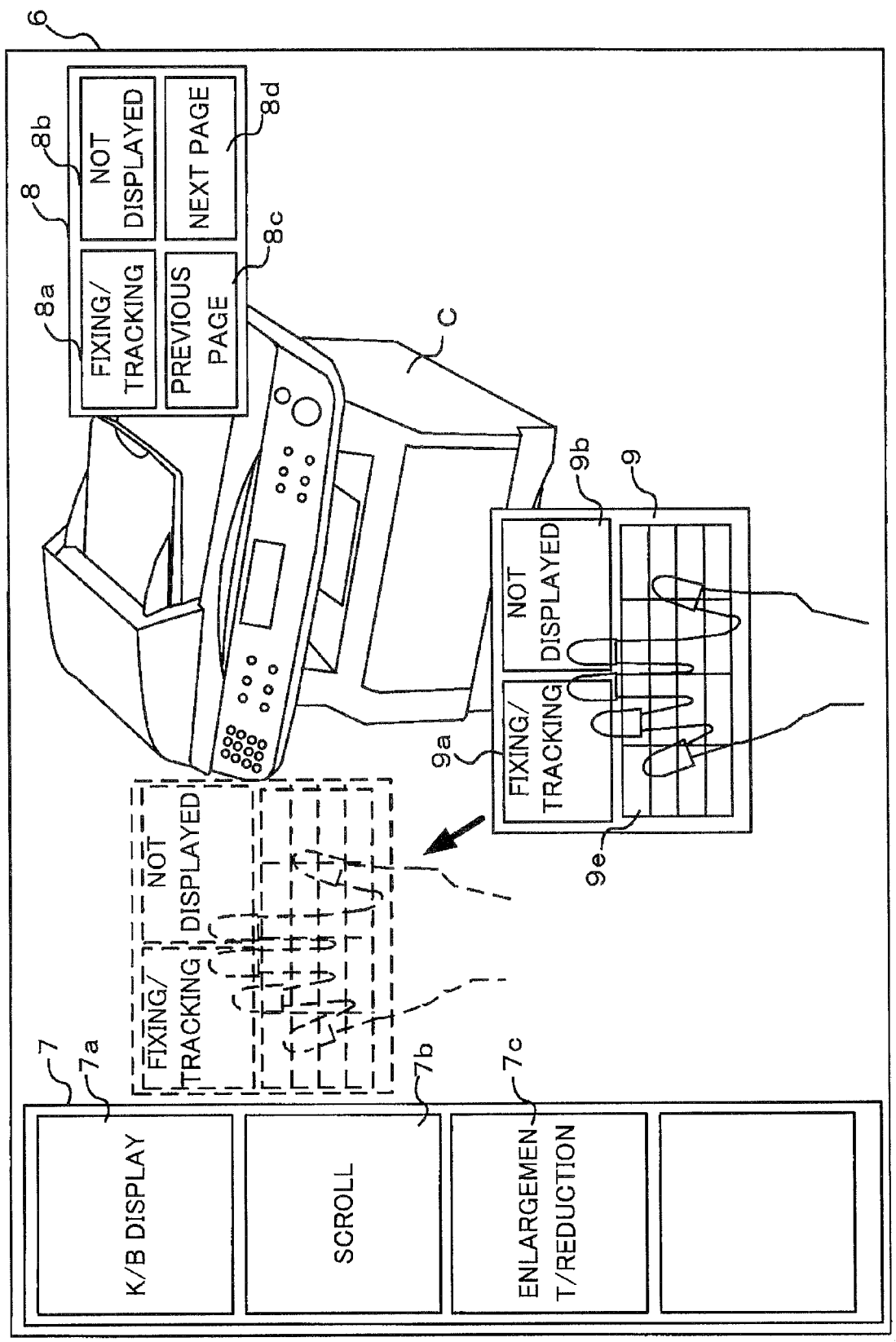
FIG. 4 is an explanatory view showing a display image displayed by the HMD according to one embodiment of the present invention.

Here, the display image displayed by the HMD 1 according to this embodiment is explained in conjunction with FIG. 4.

As shown in FIG. 4, in the inside of the display area 6 of the HMD 1, various kinds of virtual operation panels 7 to 9 are displayed. The display area 6 is set such that the display area 6 is displayed in at least a portion of the field of view of the user P. Further, the HMD 1 is a see-through type HMD and hence, the user P can observe the virtual operation panels 7 to 9 while observing an external field. To be more specific, the user P can observe devices or the like present in the external field (a multi-function machine C is shown in FIG. 4).

Further, various virtual operation panels include the virtual menu bar 7, the tracking virtual keyboards 8, 9 and the like.

A plurality of menu buttons is arranged on the virtual menu bar 7. To be more specific, a keyboard (K/B) display key 7a, a scroll key 7b and an enlargement/reduction key 7c are arranged on the virtual menu bar 7. The K/B display key 7a is a key for displaying the tracking virtual keyboards 8, 9 which track a hand of the user P. The scroll key 7b is a key for displaying a scroll key which tracks the hand of the user P. The enlargement/reduction key 7c is a key for displaying an enlargement/reduction key which tracks the hand of the user P.

The tracking virtual keyboard 8 is a scroll keyboard for changing a page of content (for example, document file), and is movable while tracking the hand of the user P.

The tracking virtual keyboard 8 includes a keyboard (K/B) fixing and tracking (fixing/tracking) key 8a, a keyboard (K/B) non-display key 8b, and an operation inputting keys (previous page key 8c, next page key 8d). The K/B fixing/tracking key 8a is a key for switching a mode in which the tracking virtual keyboard 8 is displayed in a fixed manner without tracking the hand of the user P and a mode in which the tracking virtual keyboard 8 is moved while tracking the hand of the user P. The K/B non-display key 8b is a key for making the tracking virtual keyboard 8 not displayed. The previous page key 8c is a key for changing a screen to be displayed to a previous page. The next page key 8d is a key for changing a screen to be displayed to a next page.

In the same manner as the tracking virtual keyboard 8, the tracking virtual keyboard 9 also includes a K/B fixing/tracking key 9a, a K/B non-display key 9b and the like. The tracking virtual keyboard 9 also includes a numerical keypad 9e and the like as operation inputting keys besides the above-mentioned parts.

When the tracking virtual keyboard 8, 9 is set in a tracking mode due to an operation of the K/B fixing/tracking key 8a, 9a, the tracking virtual keyboard 8, 9 is moved while tracking the hand of the user P. On the other hand, when the tracking virtual keyboard 8, 9 is set in a fixing mode due to an operation of the K/B fixing/tracking key 8a, 9a, the tracking virtual keyboard 8, 9 is not moved even when the hand of the user P is moved. Accordingly, for example, as shown in FIG. 4, although the tracking virtual keyboard 8 set in a fixing mode is not moved while tracking the hand of the user P, the tracking virtual keyboard 9 set in a tracking mode is moved while tracking the hand of the user P.

Further, by allowing the user to choose not only the tracking mode but also the fixing mode, the user can use a plurality of the tracking virtual keyboards 8, 9. The number of operation keys which one hand can operate is limited. Particularly, with respect to the tracking virtual keyboard 8, 9, to prevent an erroneous operation due to a detection error of a hand, it is inevitably necessary to make each operation key larger than a finger. Accordingly, it is impossible to arrange small operation keys in a concentrated manner. To cope with such a situation, the present invention allows the user to use the plurality of tracking virtual keyboards 8, 9 and also allows the user to select one of these tracking virtual keyboards when necessary and to operate the selected tracking virtual keyboard to track a user's hand. Accordingly, the user can perform a larger number of operations using the tracking virtual keyboards 8, 9.

The tracking processing of the tracking virtual keyboard 8, 9 is performed based on an image imaged by the CCD camera 4. That is, the controller 3 detects a position of a hand of the user P by analyzing the image imaged by the CCD camera 4. Then, the controller 3 defines a position which always takes a predetermined positional relationship with the reference position in association with the position of the hand observed by the user P through the half mirror 2c of the HMD body 2 in the display area 6 as a display position of the tracking virtual keyboard 8, 9 which tracks the position of the hand of the user P. Thereafter, the controller 3 supplies pixel signals corresponding to the image data of the tracking virtual keyboard 8, 9 to the HMD body 2. Due to such processing, the tracking virtual keyboard 8, 9 is moved while tracking the hand of the user P. Here, the description "the position associated with the hand observed by the user P" implies a position where the tracking virtual keyboard 8, 9 can be operated by the hand of the user P observed by the user P through the HMD body 2.

In this manner, by moving the tracking virtual keyboard 8, 9 while tracking the hand of the user P, even when the hand or the head of the user P is moved, it is possible to prevent the displacement between the display position of the tracking virtual keyboard 8, 9 and the operation position of the user P. That is, even when the user P naturally moves his head or his hand during the operation, the display position of the tracking virtual keyboard 8 tracks the operation position of the hand of the user P and hence, the user P can perform the stable operation inputting.

Further, the controller 3 can fix the position of the tracking virtual keyboard 8, 9 without tracking the position of the hand of the user P based on a predetermined operation. As such a predetermined operation, for example, an operation of the KB fixing/tracking key 8a, 9a or the like is considered. Accordingly, by fixing the tracking virtual keyboard 8, 9 which is not necessary without allowing the tracking virtual keyboard 8, 9 to perform tracking, it is possible to enhance the operability of the HMD 1 thus facilitating the operation of the HMD 1.

Further, the controller 3 makes a decision for setting the display of each tracking virtual keyboard 8, 9 valid or invalid in response to a predetermined operation. As such a predetermined operation, for example, an operation of the K/B display key 7a or the KB non-display key 8b, 9b is considered. To be more specific, the controller 3 allows a display of the tracking virtual keyboard 8, 9 when the display of the tracking virtual keyboard 8, 9 is set valid due to an operation of the K/B display key 7a by the user P. On the other hand, the controller 3 does not allow a display of the tracking virtual keyboard 8, 9 when the display of the tracking virtual keyboard 8, 9 is set invalid due to an operation of the K/B non-display key 8b, 9b by the user P. Accordingly, by not displaying the tracking virtual keyboard 8, 9 which is not necessary, the visibility can be enhanced thus facilitating the operation of the HMD 1.

Further, the controller 3 also allows a display of the virtual menu bar 7 for selecting the tracking virtual keyboard 8, 9 which tracks the hand of the user P out of the plurality of tracking virtual keyboard 8, 9. Accordingly, it is possible to provide various kinds of virtual operation panels thus facilitating the operation of the HMD 1.

[Electrical Constitution of HMD]

Figure 5:
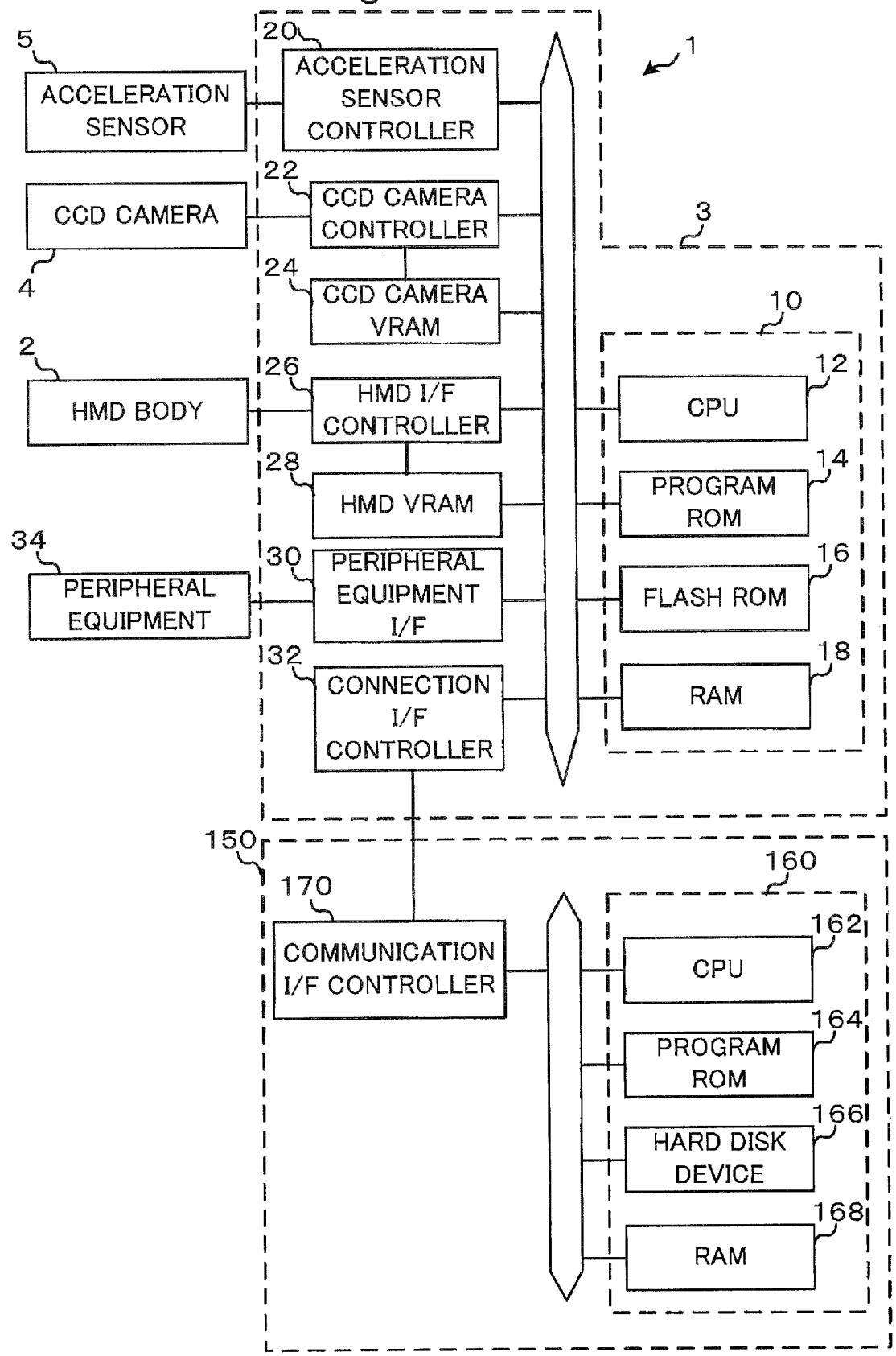
FIG. 5 is an explanatory view showing the electrical constitution of the HMD according to one embodiment of the present invention.

As shown in FIG. 5, the HMD 1 includes the HMD body 2 explained heretofore, the controller 3 which controls the HMD body 2 and the like, the CCD camera 4, the acceleration sensor 5, the peripheral equipment 34, and the control box 150.

The controller 3 includes a control part 10 which systematically controls an operation of the whole HMD 1, an acceleration sensor controller 20, a CCD camera controller 22, a CCD camera \TRAM 24, an HMD interface (indicated by "I/F" in the drawings and referred to as "I/F" hereinafter) controller 26, an HMD \TRAM 28, a peripheral equipment I/F 30, and a connection OF controller 32.

The control part 10 includes a CPU (Central Processing Unit) 12, a program ROM (Read Only Memory) 14 which is a non-volatile memory, a flash ROM (flash memory) 16, and a RAM (Random Access Memory) 18. These components are connected to a data communication bus respectively, and the transmission and reception of various kinds of information are performed via the data communication bus.

The CPU 12 is an arithmetic processing unit which operates, as the control part 10, various kinds of circuits which constitute the HMD 1 by executing various kinds of information processing programs stored in the program ROM 14 so that the CPU 12 executes various functions which the HMD 1 includes.

The flash ROM 16 stores images which are imaged by the CCD camera 4 in response to a request from the control part 10 and images supplied from other devices such as the control box 150.

The acceleration sensor controller 20 receives acceleration information transmitted from the acceleration sensor 5 based on the control of the control part 10. The acceleration sensor controller 20 supplies the acceleration information to the control part 10. The acceleration information is outputted from the acceleration sensor 5 when the acceleration sensor 5 detects the acceleration of predetermined value or more. Accordingly, the control part 10 can recognize an operation of each finger of the user P on which the acceleration sensor 5 is mounted.

The CCD camera controller 22 controls the CCD camera 4. The CCD camera VRAM 24 temporarily stores images from the CCD camera 4. The control part 10 controls the CCD camera 4 through the CCD camera controller 22 for recognizing a position of a hand or a finger of the user P. The control part 10 acquires image data imaged by the CCD camera 4 from the CCD camera VRAM 24. Although described later in detail, the control part 10 recognizes the hand of the user P by analyzing an image acquired by the CCD camera VRAM 24.

The HMD I/F controller 26 controls the HMD body 2 in response to a request from the control part 10, and supplies image signals based on image data stored in the HMD VRAM 28 to the HMD body 2 from the control part 10. Due to such an operation, the control part 10 controls the HMD 1 to display an image.

The HMD body 2 generates respective signals (signals of three primary colors consisting of R, G, B) which constitute elements for generating an image based on the image signal when an image signal is inputted from the HMD I/F controller 26. Further, laser beams based on the generated respective signals are radiated and multiplexed, and the multiplexed laser beams are scanned two-dimensionally. The two-dimensionally scanned beams are converted such that the center line of the beams is converged on a pupil of the user P and are projected on a retina of an eye Y of the user P. The general constitution and the manner of operation of the HMD body 2 are well-known (see JP-A-2007-178941, for example) and hence, the specific explanation of the HMD body 2 is omitted here.

The peripheral equipment I/F 30 is an interface provided for connecting the peripheral equipment 34 such as a power source switch, lamps and the like (not shown in the drawing) to the controller 3. For example, by connecting the power source switch or the lamps to the peripheral equipment I/F 30, the control part 10 receives operation information transmitted from switches such as the power source switch from the peripheral equipment I/F 30, and supplies lighting information on the lamps to the lamps through the peripheral equipment I/F 30.

The connection I/F controller 32 performs a control which allows communication between the controller 3 and the control box 150. The control part 10 requests the control box 150 to supply image data to the controller 3 through the connection I/F controller 32, and supplies the image data supplied to the controller 3 from the control box 150 through the connection I/F controller 32 to the HMD body 2. Further, the control part 10 supplies information transmitted from the acceleration sensor 5 or information transmitted from the peripheral equipment 34 to the control box 150 through the connection I/F controller 32.

The control box 150 includes a control part 160 which systematically controls an image display of the HMD 1 mainly and a communication IN controller 170 which controls the communication between the control box 150 and the controller 3 or other devices.

The control part 160 includes a CPU (Central Processing Unit) 162, a program ROM (Read Only Memory) 164 which is a non-volatile memory, a hard disk device (HDD) 166 and an RAM (Random Access Memory) 168. These components are connected to a data communication bus respectively, and the transmission and reception of various kinds of information are performed via the data communication bus.

The CPU 162 is an arithmetic processing unit which operates, as the control part 160, various kinds of circuits which constitute the control box 150 by executing various kinds of information processing programs stored in the program ROM 164 so that the CPU 162 executes various functions which the HMD 1 possesses.

[Size Table]

A size table stored in a flash ROM 16 in the HMD 1 having the above-mentioned constitution is explained in conjunction with FIG. 6.

The size table stored in the flash ROM 16 is a table provided for deciding sizes of the tracking virtual keyboards 8, 9. In the size table, as shown in FIG. 6, a size of a hand of the user P in appearance and a display size of the tracking virtual keyboard 8, 9 are associated with each other.

For example, when the size of a hand of the user P in appearance is not less than B (pixels) and less than A (pixels), the display size of the tracking virtual keyboard 8, 9 is set to an XL size. When the size of the hand of the user P in appearance is not less than D (pixels) and less than C (pixels), the display size of the tracking virtual keyboard 8, 9 is set to an M size. Here, the size of the hand of the user P in appearance is decided based on distances from a wrist of the user P to respective fingers of the user P.

By allowing the HMD 1 to reference such a size table, the HMD 1 can select the tracking virtual keyboard 8, 9 which corresponds to the size of the hand of the user P in appearance. Accordingly, the HMD allows the operability of the tracking virtual keyboard 8, 9 by the user P and also facilitate the operation of the HMD by the user P.

[Functional Constitution of HMD]

Figure 7:
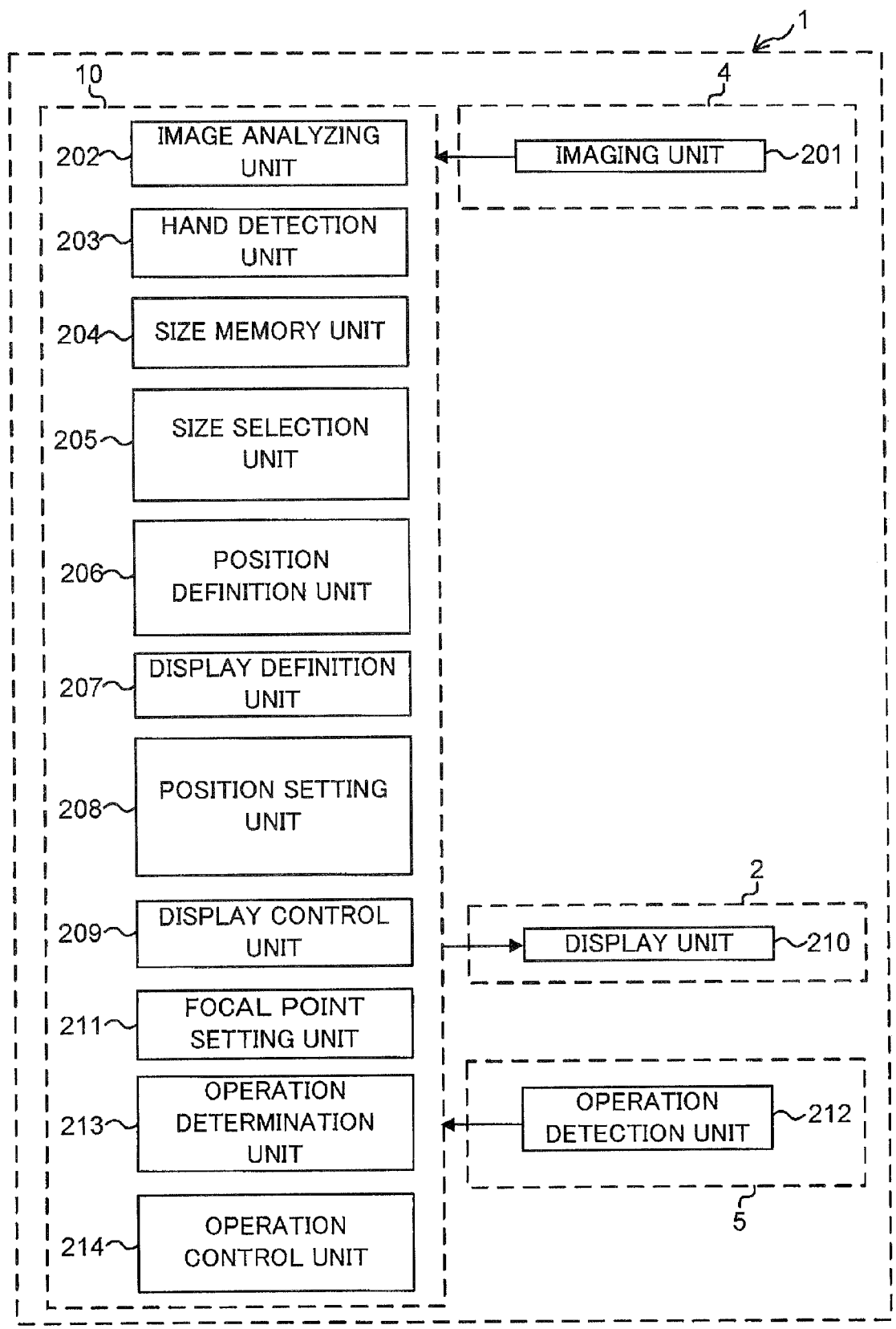
FIG. 7 is an explanatory view showing the functional constitution of the HMD according to one embodiment of the present invention.

Here, the functional constitution and the like of the HMD 1 according to this embodiment are explained in conjunction with FIG. 7.

As shown in FIG. 7, the CCD camera 4 of the HMD 1 functions as an imaging unit 201 which images a field of view of the user P, generates image data, and supplies the image data to the control part 10.

Further, the HMD body 2 of the HMD 1 functions as a display unit 210. The display unit 210 allows transmission of an ambient light La therethrough and projects an image light corresponding to image data onto an eye Y of a user P thus allowing the user P to observe an image corresponding to the image light.

The control part 10 of the HMD 1 functions as the following respective units by allowing the CPU 12 to execute a predetermined information processing program. That is, the control part 10 functions as an image analyzing unit 202, a hand detection unit 203, a size selection unit 205, a position definition unit 206 and a display definition unit 207. Further, the control part 10 also functions as a position setting unit 208, a display control unit 209, a focal point setting unit 211, an operation determination unit 213 and an operation control unit 214.

The image analyzing unit 202 analyzes image data imaged by the imaging unit 201. Particularly, the image analyzing unit 202 analyzes image data outputted from the imaging unit 201, and performs the detection of a profile and color of the image imaged by the imaging unit 201.

The hand detection unit 203 detects a hand of the user P based on a result of an analysis performed by the image analyzing unit 202. Particularly, the hand detection unit 203 detects a size of the hand of the user P in addition to a position of the hand of the user P.

The flash ROM 16 functions as a size memory unit 204. In the size memory unit 204, a size of a hand of the user P and a size table which is size information where a size of the tracking virtual keyboard 8, 9 is associated with the size of a hand of the user P (see FIG. 6) are stored.

The size selection unit 205 selects a size of the tracking virtual keyboard 8, 9 which corresponds to the size of the hand of the user P based on the size of the hand of the user P detected by the hand detection unit 203 and the size information stored in the size memory unit 204.

The position definition unit 206 defines a display position of the tracking virtual keyboard 8, 9 which tracks a position of the hand of the user P based on a position of the hand of the user P detected by the hand detection unit 203. The display position defined in this manner is a position which is associated with a hand observed by the user P through the display unit 210 in a see-through manner out of the display area by the display unit 210. That is, the position definition unit 206 defines the position where the tracking virtual keyboard 8, 9 observed by the user can be operated by the hand of the user P observed by the user P by way of the HMD body 2 as the display position of the tracking virtual keyboard 8, 9.

Particularly, the size of the tracking virtual keyboard 8, 9 which the user P can operate easily differs corresponding to the size of the hand of the user P and hence, it is also necessary to properly arrange the display position of the tracking virtual keyboard 8, 9 due to such size difference. Accordingly, the position definition unit 206 defines the display position of the tracking virtual keyboard 8, 9 based on the size of the tracking virtual keyboard 8, 9 selected by the size selection unit 205.

Further, the position definition unit 206 fixes, the position of the tracking virtual keyboard 8, 9 in response to a predetermined operation (for example, an operation of the K/B fixing/tracking key 8a, 9a by the user P). For example, assume a case where the tracking virtual keyboard 8, 9 is fixed and set due to an operation of the K/B fixing/tracking key 8a, 9a by the user P. In this case, the position definition unit 206 does not request the image data where the position of the tracking virtual keyboard 8, 9 is changed from the control box 150.

Further, assume a case where a plurality of virtual operation panels (containing the virtual menu bar 7, the tracking virtual keyboard 8, 9 and the like, for example) is set at a position in an overlapping manner. In this case, the position definition unit 206 makes the tracking movement decision which allows, by priority, the tracking virtual keyboard which is selected for tracking the position of the hand of the user P latest out of the plurality of overlapping tracking virtual keyboard 8, 9 to track.

The display definition unit 207 makes a definition for setting the display of the tracking virtual keyboard 8, 9 valid or invalid in response to a predetermined operation (for example, an operation of the K/B display key 7a or the K/B non-display key 8b, 9b by the user P). Here, setting the display of the tracking virtual keyboard 8, 9 valid is to display the tracking virtual keyboard 8, 9 in the display area 6. On the other hand, setting the display of the tracking virtual keyboard 8, 9 invalid is not to display the tracking virtual keyboard 8, 9 in the display area 6.

The position setting unit 208 sets the virtual menu bar 7 (selection-use virtual operation panel) for selecting the tracking virtual keyboard 8, 9 which is set to track the hand of the user P from the plurality of virtual operation panels in a predetermined display position (for example, a left side) in the display area 6.

The display control unit 209 controls the display unit 210 to display the virtual operation panel (the virtual menu bar 7 or the tracking virtual keyboard 8, 9) at the display position defined by the position definition unit 206. Further, the display control unit 209 controls the display unit 210 to display the tracking virtual keyboard 8, 9 which is set valid by the display definition unit 207. Further, the display control unit 209 controls the display unit 210 to prevent displaying of the tracking virtual keyboard 8, 9 which is set invalid by the display definition unit 207.

The focal point setting unit 211, when the tracking virtual keyboard 8, 9 is set valid by the display definition unit 207, sets a focal length of the imaging unit 201 to a specified focal length. Here, the specified focal length is preliminarily stored in the flash ROM 16 as a standard distance within which the hand of the user P is present. However, the distance can be also set in accordance with an operation by the user P.

The acceleration sensors 5a to 5e are mounted on fingers of the user P, and function as operation detection units 212 for detecting operations of the fingers of the user P.

The operation determination unit 213 determines whether or not the virtual operation panel is operated based on an operation conducted by a finger detected by the operation detection unit 212.

That is, when the acceleration information from any one of the acceleration sensors 5a to 5e indicates the acceleration of a predetermined value or more, the operation determination unit 213 determines that the finger on which the acceleration sensor 5 outputting the acceleration information is mounted is moved. Further, the operation determination unit 213 determines whether or not the virtual operation panel is operated based on whether or not the position coordinates of the moved finger agree with coordinates of the key on the virtual operation panel (the virtual menu bar 7 or the tracking virtual keyboard 8, 9). For example, when the position coordinates of the moved finger agree with coordinates of the K/B non-display key 8b on the tracking virtual keyboard 8, the operation determination unit 213 determines that the K/B non-display key 8b is operated.

The operation control unit 214, when it is determined by the operation determination unit 213 that the virtual operation panel is operated, performs a control corresponding to an operation position of the virtual operation panel.

For example, the operation control unit 214, when the display key 7a of the virtual menu bar 7 is operated, performs a control of displaying the tracking virtual keyboard 8, 9 in the display area 6. Further, the operation control unit 214, when the non-display key 9b of the tracking virtual keyboard 8, 9 is operated, performs a control of erasing the tracking virtual keyboard 8, 9 from the display area 6. Still further, the operation control unit 214, when the tracking virtual keyboard 8, 9 is set in a tracking mode, performs a control of moving the tracking virtual keyboard 8, 9 set in a tracking mode within the display area 6 depending on the position of the hand of the user P.

In this embodiment, the display, the movement or the erasing of the tracking virtual keyboard 8, 9 is performed in accordance with a request to the control box 150 for such display, the movement or erasing. That is, the operation control unit 214 requests the control box 150 for image data for displaying the tracking virtual keyboard 8, 9, image data for moving the display position of the tracking virtual keyboard 8, 9 or the image data for erasing the tracking virtual keyboard 8, 9. The operation control unit 214 displays the image data acquired from the control box 150 on the HMD body 2 in response to such a request. In displaying or moving the tracking virtual keyboard 8, 9, the control box 150 transmits image data formed by synthesizing the image which displays or moves the tracking virtual keyboard 8, 9 to an image of content to the controller 3. The image of the tracking virtual keyboard 8, 9 may be synthesized with an image acquired from the control box 150 inside the controller 3.

[Control Operation]

Figure 10A:
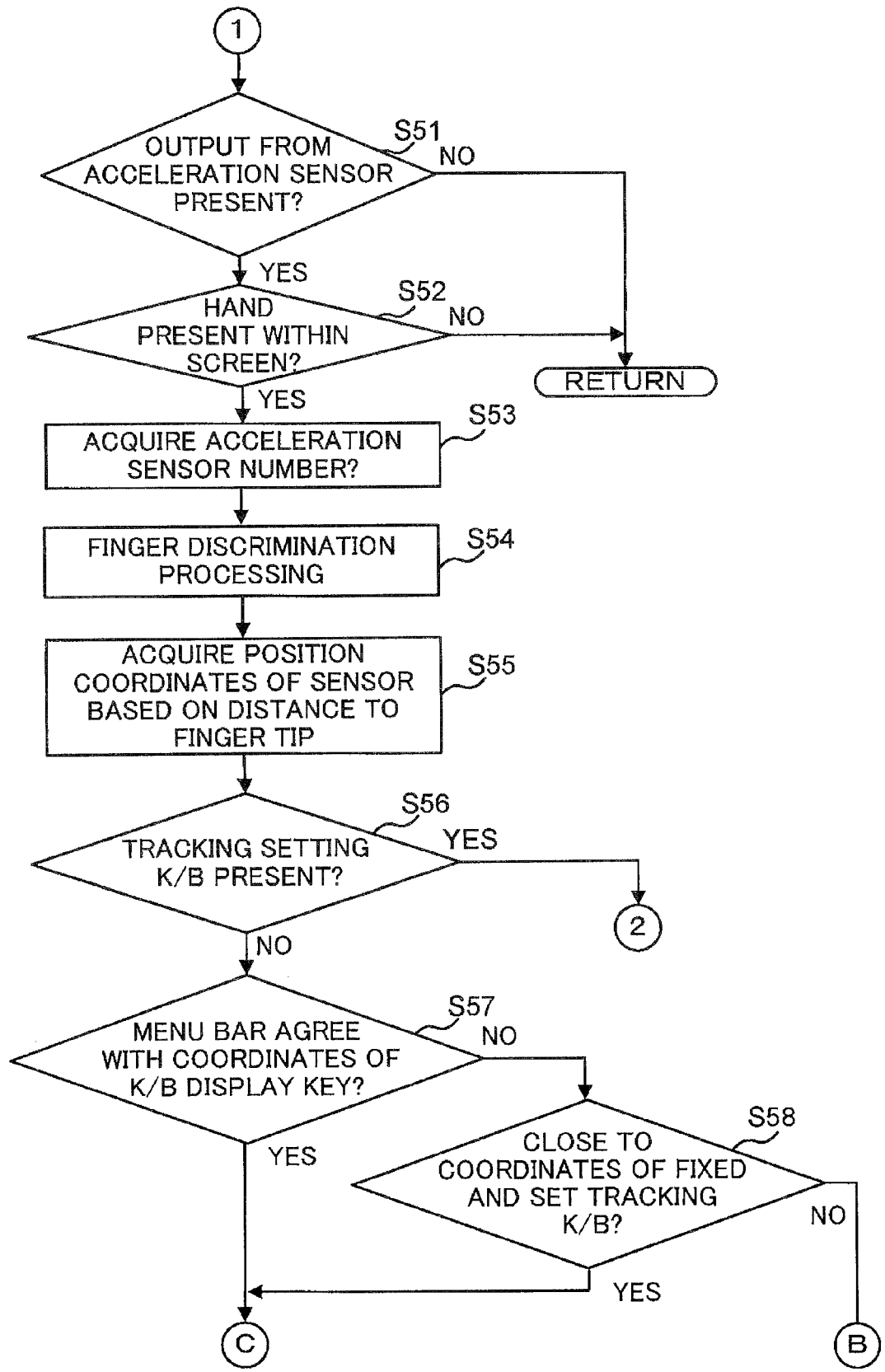
FIG. 10A is a flow chart showing one example of processing which is executed in performing the control of the HMD.
Figure 10B:
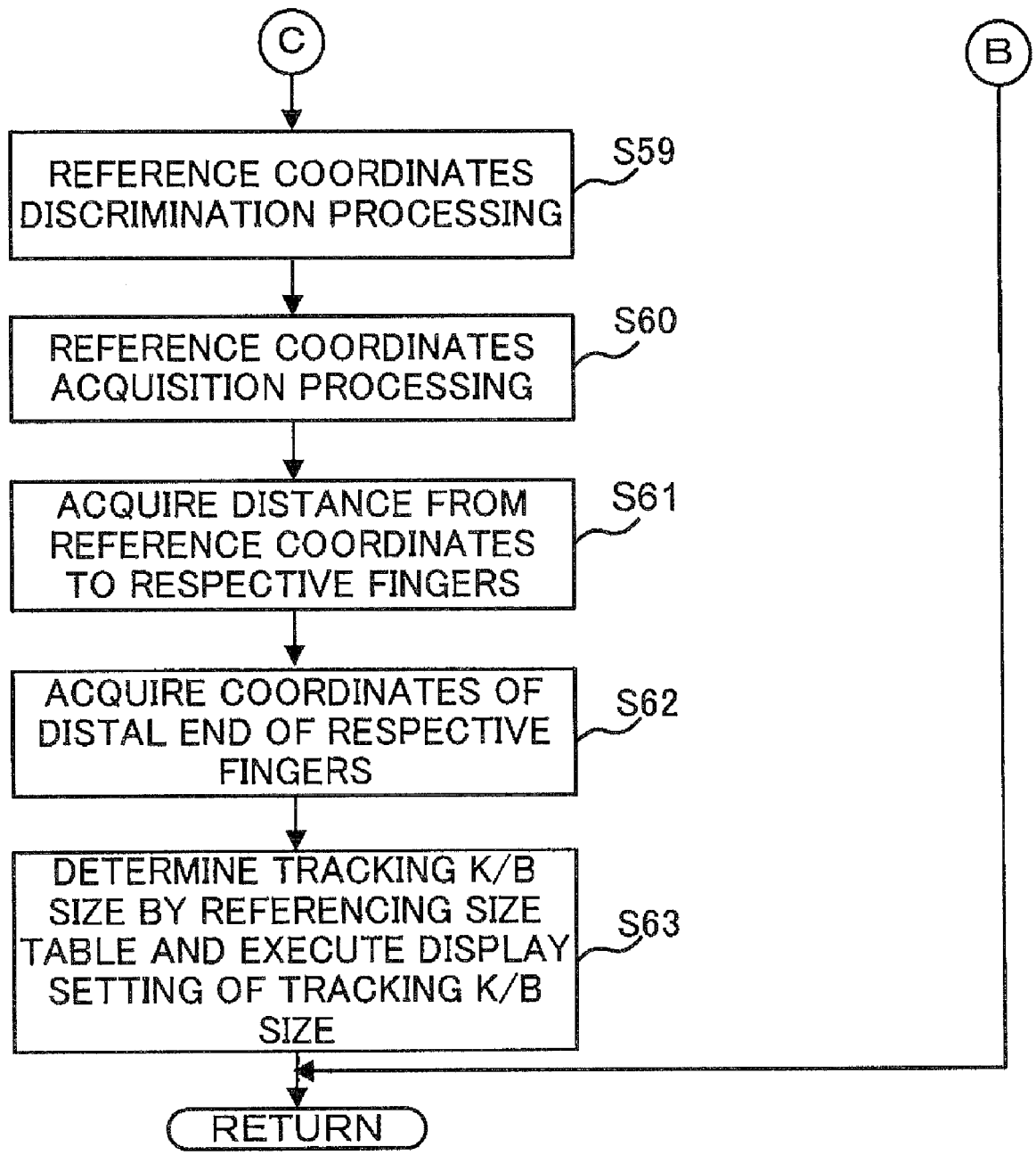
FIG. 10B is a flow chart showing one example of processing which is executed in performing the control of the HMD.
Figure 11:
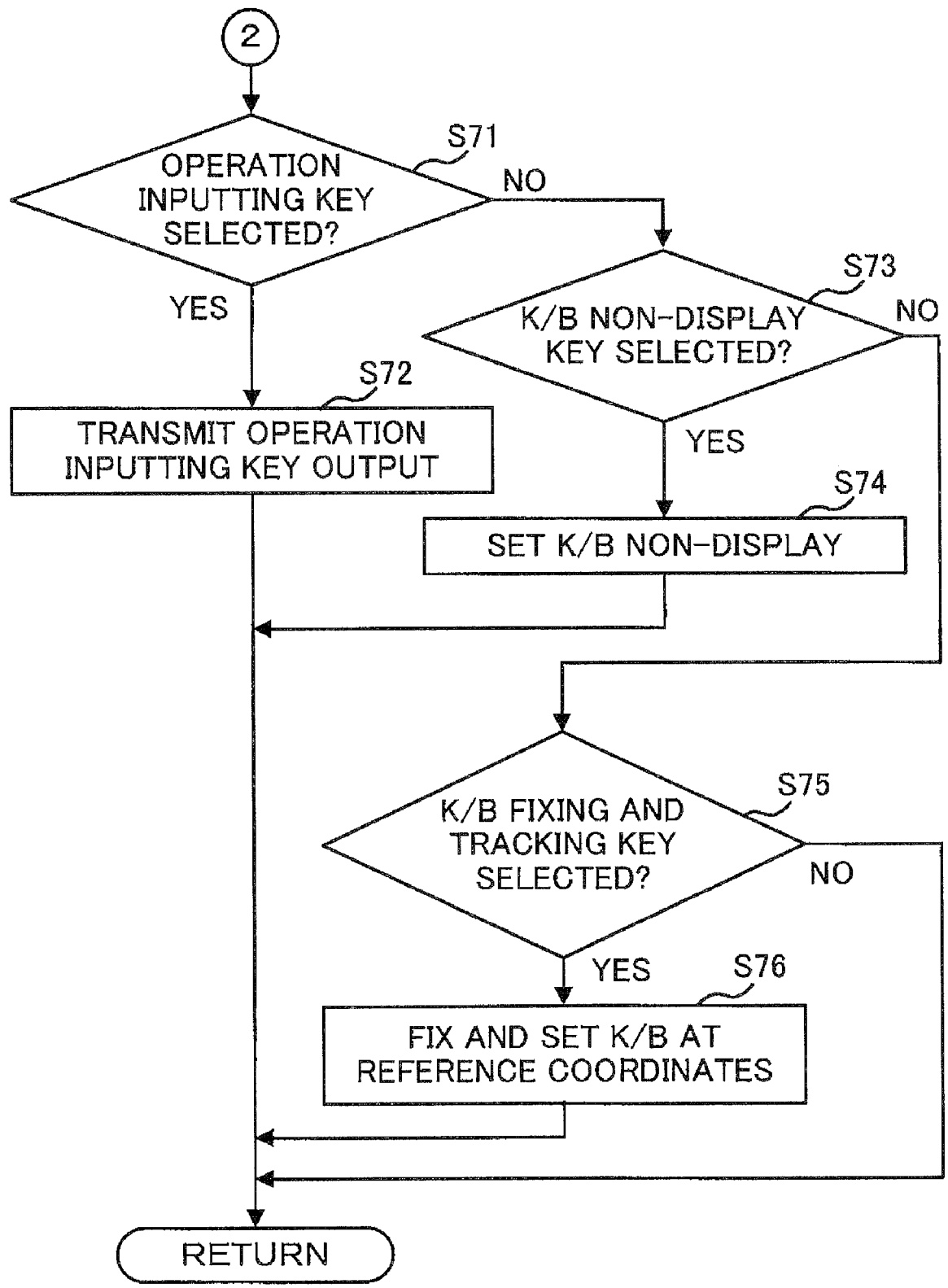
FIG. 11 is a flow chart showing one example of processing which is executed in performing the control of the HMD.
Figure 12:
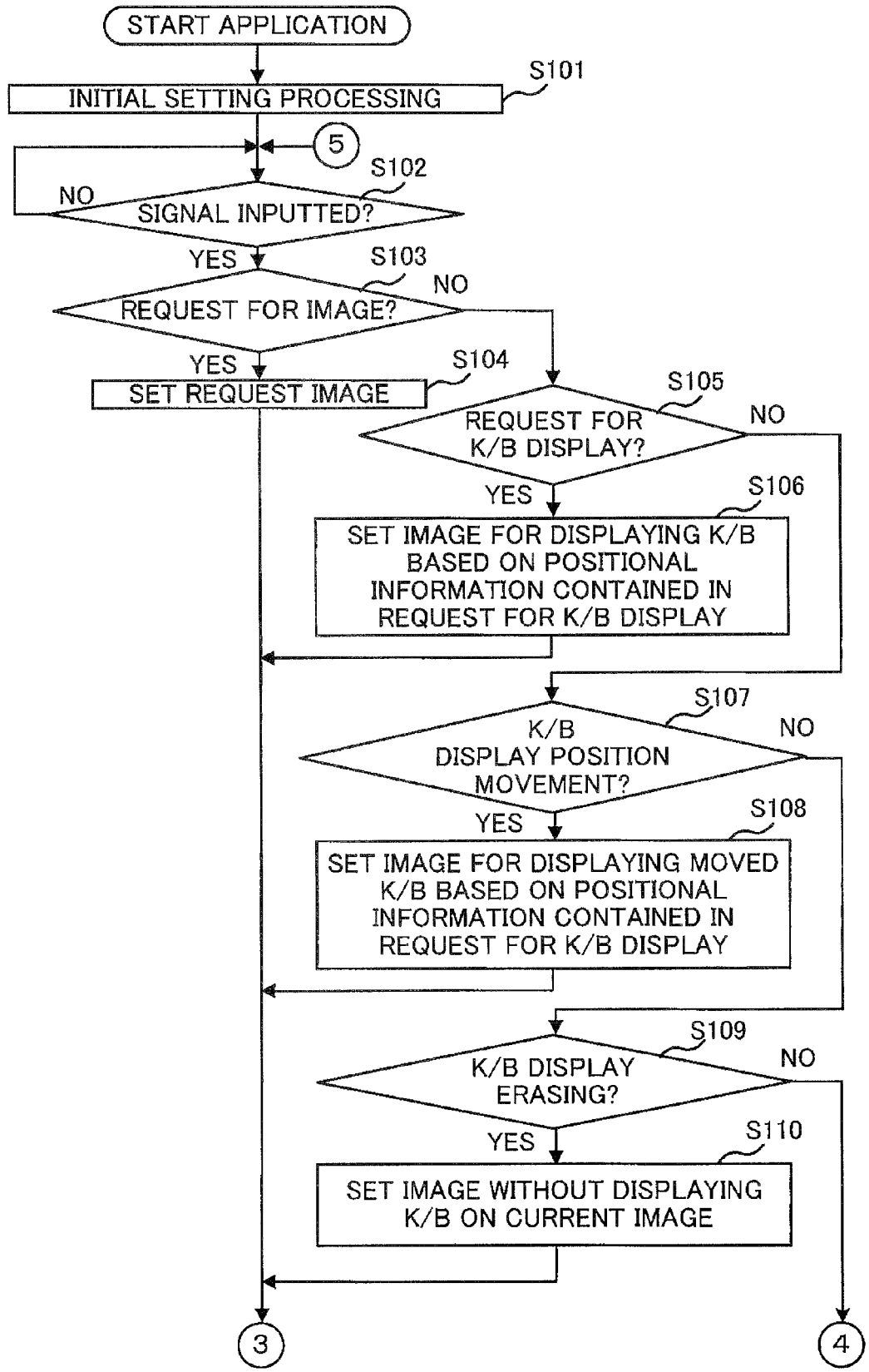
FIG. 12 is a flow chart showing one example of processing which is executed in performing the control of the HMD.

Next, the manner of operation of the HMD 1 is explained in conjunction with flow charts shown in FIG. 8 to FIG. 13. Main processing shown in FIG. 8 is executed by the control part 10 in the controller 3 when the power source of the HMD 1 is turned on. Due to such execution of the main processing, the control part 10 of the controller 3 functions as the above-mentioned respective units. Further, main processing shown in FIG. 12 is executed by a control part 160 after a predetermined application starting operation is performed by the control box 150. Due to such execution of the main processing, the control part 160 of the control box 150 functions as the above-mentioned respective units. In the explanation made hereinafter, the explanation is made by mainly focusing on the tracking virtual keyboard 8 as a representative of the tracking virtual keyboards 8, 9.

[Main Processing]

Firstly, as shown in FIG. 8, when electricity is supplied to the HMD 1, the control part 10 performs initial setting (step S10). In this processing, the control part 10 executes initial setting such as RAM access permission and initializing of a working area. When this processing is finished, the control part 10 advances the processing to step S11.

In step S11, the control part 10 requests image data from the control box 150. Then, the control part 10 determines whether or not image data is inputted from the control box 150 (step S12).

When the control part 10 determines that image data is inputted from the control box 150 (step S12: YES), the control part 10 advances the processing to step S13.

On the other hand, when the control part 10 determines that the image data is not inputted from the control box 150 (step S12: NO), the control part 10 returns the processing to step S12, and the processing in step S12 is repeated until image data is inputted.

In step S13, the control part 10 outputs the image data inputted from the control box 150 to the HMD body 2 as an image signal. The image data inputted from the control box 150 is image data which contains an image on a first page of an initialized content and an image on the virtual menu bar 7. Due to such processing, the HMD body 2 displays the image which contains the image on the first page and the image on the virtual menu bar 7 such that the image is visible to a user P. When this processing is finished, the control part 10 advances the processing to step S14. In this embodiment, the control part 10 which executes such processing functions as the position setting unit 208, and the display control unit 209.

In step S14, the control part 10 determines whether or not new image data is inputted from the control box 150 and an image signal based on the image data is outputted.

When the control part 10 determines that the new image data is inputted from the control box 150 and the image signal based on the image data is outputted (step S14: YES), the control part 10 outputs the image data inputted from the control box 150 to the HMD body 2 as an image signal (step S15), and advances the processing to step S16.

On the other hand, when the control part 10 determines that the new image data is not inputted from the control box 150 and the image signal based on the image data is not outputted (step S14: NO), the control part 10 advances the processing to step S16 without executing processing in step S15.

In step S16, the control part 10 determines whether or not a camera image is inputted. In this processing, the control part 10 reads out image data from the CCD camera VRAM 24 in which image data from the CCD camera 4 is stored, and determines whether or not the camera image is inputted based on whether or not the image data is updated.

When the control part 10 determines that the camera image is inputted (step S16: YES), the control part 10 executes camera received image processing in which an analysis based on the image inputted from the CCD camera 4, a control based on a result of the analysis and the like are performed (step S17), and the control part 10 advances the processing to step S18. This step S17 is described in detail later in conjunction with FIG. 9A to FIG. 11.

On the other hand, when the control part 10 determines that camera image is not inputted (step S16: NO), the control part 10 advances the processing to step S18 without executing the processing in step S17.

In step S18, the control part 10 determines whether or not actions such as a display, movement, an operation, erasing of the tracking virtual keyboard 8 are made by the user P. For example, when display setting of the tracking virtual keyboard 8 is performed in step S42 or in step S63, the control part 10 determines that the action "display" is made. Further, when movement setting of the tracking virtual keyboard 8 is made in step S46 or step S63, the control part 10 determines that the action "movement" is made. Further, when setting of key inputting/outputting is set in step S64, the control part 10 determines that the action "operation" is made. Further, when erasing of the tracking virtual keyboard 8 is set in step S36, the control part 10 determines that the action "erasing" is made. Further, when output setting of the operation inputting key is performed in step S64 or in step S72, the control part 10 determines that "operation of the operation inputting key" is made.

When the control part 10 determines that the action is made (step S18: YES), the control part 10 advances the processing to step S19. On the other hand, when the control part 10 determines that the action is not made (step S18: NO), the control part 10 returns the processing to step S14.

In step S19, the control part 10 executes image determination outputting processing. In this processing, the control part 10 outputs the image determination indicative of contents of actions such as display, movement, operation, erasing and fixing of the tracking virtual keyboard 8 to the control box 150. In this image determination, the display of the tracking virtual keyboard 8 is outputted to the control box 150 as the K/B display request, and the movement of the tracking virtual keyboard 8 is outputted to the control box 150 as the K/B display position movement request. Further, erasing of the tracking virtual keyboard 8 is outputted to the control box 150 as the K/B display erasing request, and the operation of the tracking virtual keyboard 8 is outputted to the control box 150 as keyboard operation information. When such processing is finished, the control part 10 advances the processing to step S20.

In step S20, the control part 10 determines whether or not the power source is turned off. The control part 10 determines whether or not the power source is turned off in response to an operation of the power source switch or the like. When the control part 10 determines that the power source is turned off (step S20: YES), the main processing is finished. On the other hand, when the control part 10 determines that the power source is not turned off (step S20: NO), the control part 10 returns the processing to step S14. Due to such operations, the control part 10 repeatedly executes processing ranging from step S14 to step S20 until the power source is turned off.

[Camera Received Image Processing]

A subroutine executed in step S17 in FIG. 8 is explained in conjunction with FIG. 9A to FIG. 11.

Figure 9A:
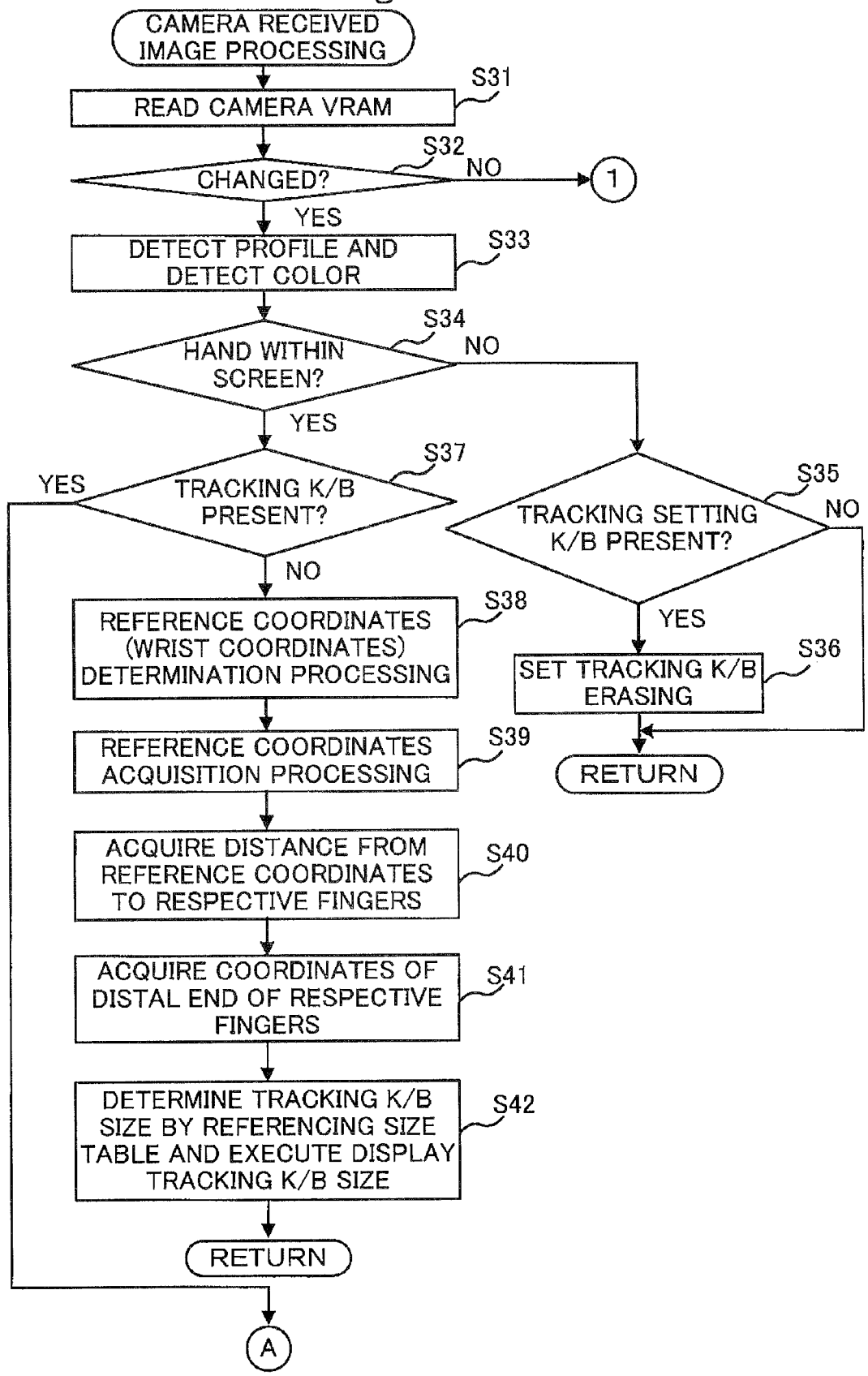
FIG. 9A is a flow chart showing one example of processing which is executed in performing the control of the HMD.

Firstly, as shown in FIG. 9A, the control part 10 reads out image data from the CCD camera VRAM 24 (step S31). Then, the control part 10 compares whether or not the image data is the same as the previous image data, and determines whether or not the image data is changed (step S32). In this processing, when the control part 10 determines that the image data is changed (step S32: YES), the control part 10 advances the processing to step S33. On the other hand, when the control part 10 determines that the image data is not changed (step S32: NO), the control part 10 advances the processing to step S51 shown in FIG. 10A.

In step S33, the control part 10 executes the detection of a profile and color of the changed image data. That is, the control part 10 analyzes the image in an imaging region of the CCD camera 4. Then, the control part 10 executes processing for detecting a profile of a hand of the user P based on a result of the profile detection and the color detection. For example, the control part 10 extracts only a skin-color portion, and executes image processing based on a shape of the extracted skin-color so as to detect the profile of the hand of the user P.

In step S34, the control part 10 determines whether or not the hand of the user P is present within a screen. For example, the control part 10 can determine that the hand of the user P is present within the display area 6 based on the size and the shape of the profile of the hand of the user P. That is, the control part 10 determines whether or not the detected profile is of a size within a predetermined range. The control part 10 determines whether or not the detected profile is analogous to the shape of a hand, for example, there exists the high correlation between the shape of the profile and a predetermined shape, or an upper portion of the shape of the profile is branched into a plurality of portions with respect to the lower portion. As the predetermined shape, a typical shape of a hand is preliminarily registered. In this processing, when the control part 10 determines that the hand of the user P is present within the display area 6 (step S34: YES), the control part 10 advances the processing to step S37. On the other hand, when the control part 10 determines that the hand of the user P is not present within the display area 6 (step S34: NO), the control part 10 advances the processing to step S35.

In step S35, the control part 10 determines whether or not the tracking virtual keyboard 8 which is set in a tracking mode is present within the display area 6 of the HMD body 2. When the control part 10 determines that the tracking virtual keyboard 8 which is set in a tracking mode is present within the display area 6 of the HMD body 2 (step S35: YES), the hand of the user P is not present within an imaging range and the tracking virtual keyboard 8 which is set in a tracking mode is being displayed and hence, the tracking keyboard is erased (step S36), and the control part 10 finishes this subroutine.

On the other hand, when the control part 10 determines that the tracking virtual keyboard 8 which is set in a tracking mode is not present within the display area 6 of the HMD body 2 (step S35: NO), the hand of the user P is not present within the imaging range and the tracking virtual keyboard 8 which is set in a tracking mode is not being displayed and hence, the control part 10 finishes this subroutine without executing the processing in step S36.

In this manner, when the hand of the user P is not present within the imaging range of the CCD camera 4, the control part 10 erases the tracking virtual keyboard 8.

On the other hand, in step S37, the control part 10 determines whether or not the tracking virtual keyboard 8 is present within the display area 6 of the HMD body 2. In this processing, irrespective of whether the tracking virtual keyboard 8 is set in a fixing mode or in a tracking mode, it is determined whether or not the tracking virtual keyboard 8 is present within the display area 6 of the HMD body 2.

When the control part 10 determines that the tracking virtual keyboard 8 is present within the display area 6 of the HMD body 2 (step S37: YES), the control part 10 advances the processing to step S43. On the other hand, when the control part 10 determines that the tracking virtual keyboard 8 is not present within the display area 6 of the HMD body 2 (step S37: NO), the control part 10 advances the processing to step S38.

In step S38, the control part 10 executes reference coordinates determination processing. In this processing, the control part 10 determines a position of a wrist of a hand of the user P as reference coordinates based on a result of the analysis of the image data outputted from the CCD camera 4, and acquires the determined reference coordinates (wrist position) of the user P by such determination (step S39). For example, the control part 10 determines a position which constitutes a lower portion of a profile of the detected hand of the user P where a reduction ratio of a width of the profile in the approximately horizontal direction is set smaller than a predetermined value as the wrist position, and the control part 10 acquires a middle point between coordinates of the profile at the wrist position as the reference coordinates. By setting the wrist position as the reference coordinates in this manner, even when the user P moves his finger for performing a key operation, the display position of the tracking virtual keyboard 8 does not track the movement of the finger so that the user P can perform a stable and reliable operation.

Then, the control part 10 acquires distances from the reference coordinates to respective fingers (step S40), and the control part 10 also acquires distal-end coordinates of the respective fingers (step S41). That is, the control part 10 determines respective distal ends of branched portions of an upper portion of the detected profile as distal ends of the respective fingers. The control part 10 can acquire distances from the reference coordinates and coordinates with respect to the reference coordinates. Accordingly, based on the result of the analysis of the image data outputted from the CCD camera 4, the control part 10 detects the hand of the user P, and detects a size of the hand of the user P in addition to the position of the hand of the user P. For example, the control part 10 may set the largest distance out of distances from the reference coordinates to the respective fingers as a size of the hand, and may also set a distance between the remotest two coordinates from the coordinates of finger tips as a size of the hand.

Then, the control part 10 references a size table (see FIG. 6), and decides the size of the tracking virtual keyboard 8 based on the size of the hand of the user P (step S42). Then, the control part 10 executes display setting of the tracking virtual keyboard 8 which tracks the hand of the user P. As shown in FIG. 4, the control part 10, for example, by setting a wrist position of the user P as a reference position, displays the tracking virtual keyboard 8 in a finger-side region (for example, ½ region) out of a range defined between the remotest finger tip from the wrist position and the wrist position out of the profile of the hand of the user P, that is, within a region where the fingers of the user P are present. Further, the control part 10 may display the tracking virtual keyboard 8 on a finger proximal end of the user P, that is, above a proximal portion where the profile is branched.

Then, the control part 10, as the result of display setting, outputs the K/B display request to the control box 150 in the above-mentioned step S19. The K/B display request contains the size of the tracking virtual keyboard 8, position coordinates of the tracking virtual keyboard 8 corresponding to the position of the wrist of the user P and the like. Due to such outputting of the KB display request, in the control box 150, image data for displaying the tracking virtual keyboard 8 is generated and is outputted to the controller 3.

That is, the control part 10, based on the size of the hand of the user P detected in step S41 and the size table stored in the flash ROM 16, selects a size of the tracking virtual keyboard 8 corresponding to the size of the hand of the user P.

Further, the control part 10 displays the tracking virtual keyboard 8 set in a tracking mode at an uppermost layer thus detecting an operation by priority. That is, when a plurality of virtual operation panels (virtual menu bar 7 and tracking virtual keyboards 8, 9) is set at a position in an overlapping manner, the control part 10 sets the latest selected tracking virtual keyboard 8 which tracks the position of the hand of the user P by priority out of the plurality of these overlapping virtual operation panels. When this processing is finished, the control part 10 finishes this subroutine.

Figure 9B:
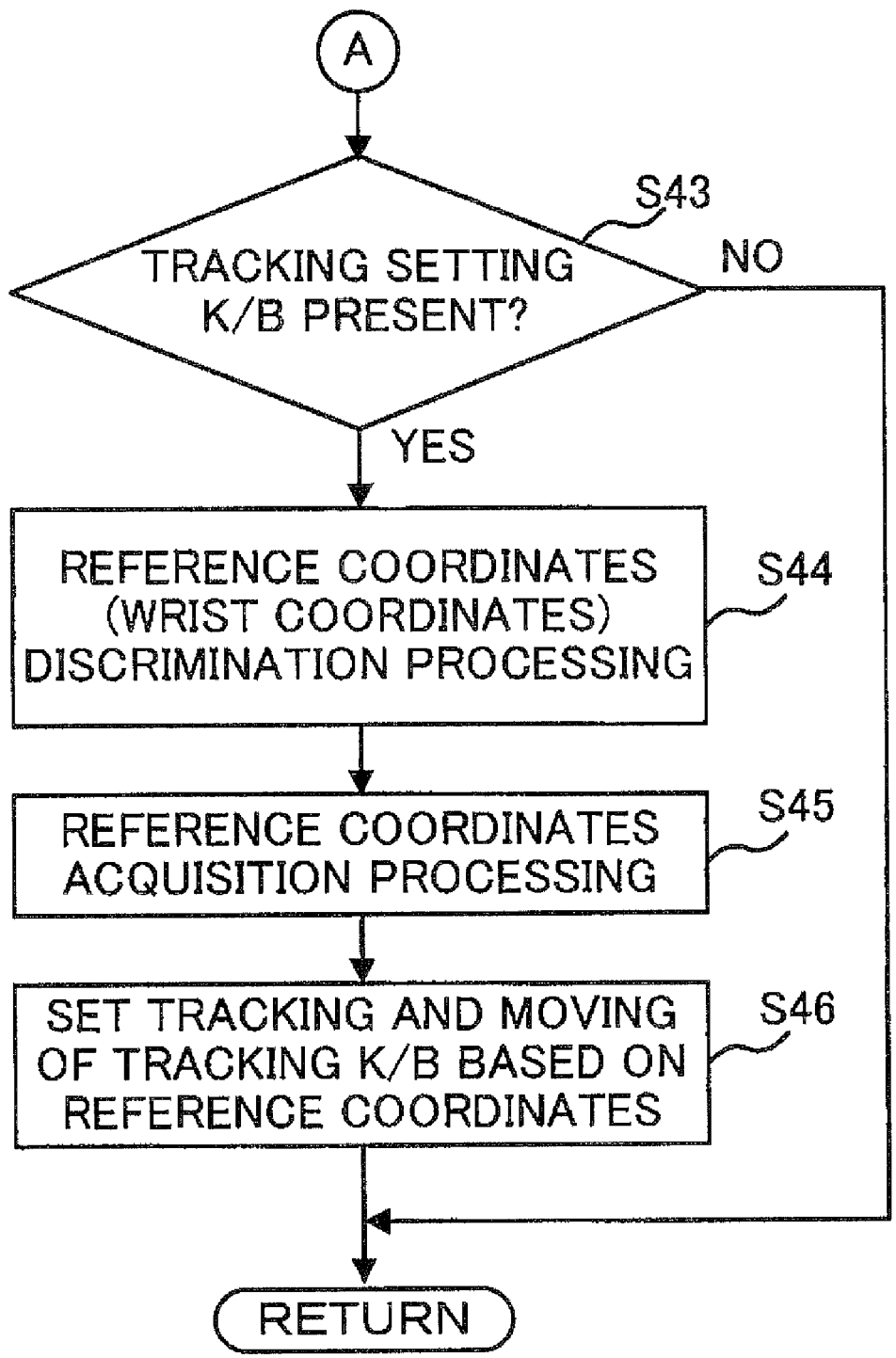
FIG. 9B is a flow chart showing one example of processing which is executed in performing the control of the HMD.

On the other hand, in step S43, as shown in FIG. 9B, the control part 10 determines whether or not the tracking virtual keyboard 8 set in a tracking mode is present. When the control part 10 determines that the tracking virtual keyboard 8 set in a tracking mode is present in this processing (step S43: YES), the control part 10 advances the processing to step S44. On the other hand, when the control part 10 determines that the tracking virtual keyboard 8 set in a tracking mode is not present (step S43: NO), the control part 10 finishes this subroutine without executing the processing ranging from step S44 to step S46.

In step S44, the control part 10 determines a position of a wrist of a hand of the user P as reference coordinates based on the result of the analysis of the image data outputted from the CCD camera 4, and acquires the determined reference coordinates (wrist position) of the user P (step S45). In this manner, the control part 10 detects the hand of the user P and detects the position of the hand of the user P based on the result of the analysis of the image data outputted from the CCD camera 4.

Then, the control part 10 performs setting of tracking movement of the tracking virtual keyboard 8 based on the reference coordinates (step S46).

The reference coordinates acquired in the above-mentioned manner uses a portion of the hand of the user P as the reference. Accordingly, when the hand of the user P is moved, the tracking virtual keyboard 8 is moved while tracking the hand of the user P. Further, a size of the tracking virtual keyboard 8 is the size which is decided in the above-mentioned step S42. In this manner, by using the portion of the hand of the user P different from fingers such as the wrist as a reference, even when the user P moves his fingers for operation, the position of the tracking virtual keyboard 8 does not track the movement of the fingers and hence, the user can perform the stable operation.

Then, the control part 10, as a result of the tracking movement setting, in the above-mentioned step S19, outputs the K/B display position movement request to the control box 150. This K/B display position movement request contains the position coordinates of the tracking virtual keyboard 8 corresponding to the position of the wrist of the user P and the like. Accordingly, image data which allows the tracking virtual keyboard 8 to track the hand of the user P and to perform a display is generated in the control box 150, and is outputted to the controller 3.

Further, the control part 10 displays the tracking virtual keyboard 8 set in a tracking mode at an uppermost layer thus detecting an operation by priority. That is, when a plurality of virtual operation panels (virtual menu bar 7 and tracking virtual keyboards 8, 9) is set at a position in an overlapping manner, the control part 10 sets the latest selected tracking virtual keyboard 8 which tracks the position of the hand of the user P by priority out of the plurality of these overlapping virtual operation panels. When this processing is finished, the control part 10 finishes this subroutine.

In step S51 shown in FIG. 10A, the control part 10 determines whether or not the acceleration information which indicates the acceleration of a predetermined value or more is outputted from any one of the acceleration sensors 5a to 5e. In this processing, when the control part 10 determines that the acceleration information is outputted from the acceleration sensor 5 (step S51: YES), the control part 10 advances the processing to step S52. On the other hand, when the control part 10 determines that the acceleration information is not outputted from the acceleration sensor 5 (step S51: NO), the control part 10 finishes this subroutine.

Then, the control part 10 detects the profile of the hand of the user P based on the result of the above-mentioned profile detection and color detection, and determines whether or not the hand of the user P is present within the display area 6 (screen) (step S52). In this processing, when the control part 10 determines that the hand of the user P is present within the display area 6 (step S52: YES), the control part 10 advances the processing to step S53. On the other hand, when the control part 10 determines that the hand of the user P is not present within the display area 6 (step S52: NO), the control part 10 finishes this subroutine.

On the other hand, in step S53, the control part 10 acquires the acceleration sensor number from the acceleration sensor which outputs the acceleration information indicating the acceleration exceeding the predetermined value out of the acceleration sensors 5a to 5e (hereinafter referred to as "operated acceleration sensor 5"). Then, the control part 10 performs finger discrimination processing which discriminates the operated finger based on the acquired acceleration sensor number (step S54). Thereafter, the control part 10 acquires position coordinates of the operated acceleration sensor 5 based on a distance between the reference coordinates and the finger tip (step S55).

Then, the control part 10 determines whether or not the tracking virtual keyboard 8 set in a tracking mode is present within the display area 6 of the HMD body 2 (step S56). When the control part 10 determines that the tracking virtual keyboard 8 set in a tracking mode is present within the display area 6 of the HMD body 2 (step S56: YES), the control part 10 advances the processing to step S71 shown in FIG. 11. On the other hand, when the control part 10 determines that the tracking virtual keyboard 8 set in a tracking mode is not present within the display area 6 of the HMD body 2 (step S56: NO), the control part 10 advances the processing to step S57.

In step S57, the control part 10 determines whether or not the position coordinates of the operated acceleration sensor 5 agree with position coordinates of the KB display key 7a of the virtual menu bar 7. The control part 10 determines whether or not the virtual menu bar 7 is operated based on the position coordinates of the operated acceleration sensor 5. The virtual menu bar 7 is a selection-use virtual operation panel for selecting the tracking virtual keyboard which is allowed to track the hand of the user P out of the plurality of tracking virtual keyboards 8. Each time the user P operates the K/B display key 7a, the number of tracking virtual keyboards 8 is increased. The virtual menu bar 7 is sufficiently largely displayed compared to keys of the virtual operation panel, and is used only for the first operation necessary for selecting a kind of the virtual operation panel. Accordingly, a fine key operation is unnecessary so that operability of the virtual menu bar 7 is not spoiled even when the virtual menu bar 7 is fixed within the display image.

When the control part 10 determines that the position coordinates of the operated acceleration sensor 5 agree with the position coordinate of the KM display key 7a of the virtual menu bar 7 (step S57: YES), the control part 10 sets a focal length of the CCD camera 4 to a standard distance where the hand of the user P is present, and advances the processing to step S59. On the other hand, when the control part 10 determines that the position coordinates of the operated acceleration sensor 5 do not agree with the position coordinate of the K/B display key 7a of the virtual menu bar 7 (step S57: NO), the control part 10 advances the processing to step S58.

In step S58, the control part 10 determines whether or not the imaged position coordinate of the hand of the user P is near the position coordinates of the tracking virtual keyboard 8 set in a fixing mode. That is, in a case where the position of the tracking virtual keyboard 8 is fixed, the control part 10 determines whether or not the position of the hand of the user P falls within a predetermined distance from the position of the tracking virtual keyboard 8 based on the result of the analysis of the image data outputted from the CCD camera 4. Here, when the position of the hand of the user P falls within the predetermined distance from the position of the tracking virtual keyboard 8, the control part 10 may define the position of the tracking virtual keyboard 8 as a display position of the tracking virtual keyboard 8 which tracks the position of the hand of the user P. By executing such processing, the tracking virtual keyboard which tracks the position of the hand of the user can be easily selected thus facilitating an operation of the HMD 1.

When the control part 10 determines that the coordinates of the imaged hand of the user P is near the position coordinate of the tracking virtual keyboard 8 set in a fixing mode (step S58: YES), the control part 10 sets a focal length of the CCD camera 4 to a standard distance where the hand of the user P is present, and advances the processing to step S59. On the other hand, when the control part 10 determines that the coordinates of the imaged hand of the user P is not near the position coordinate of the tracking virtual keyboard 8 set in a fixing mode (step S58: NO), the control part 10 finishes this subroutine.

In step S59, as shown in FIG. 10B, the control part 10 determines the position of the wrist of the hand of the user P as the reference coordinates based on the result of the analysis of the image data outputted from the CCD camera 4. The control part 10 acquires the determined reference coordinates (wrist position) of the user P (step S60).

The control part 10 acquires distances from the reference coordinates to respective fingers (step S61). The control part 10 also acquires distal-end coordinates of the respective fingers (step S62). Accordingly, the control part 10, based on the result of the analysis of the image data outputted from the CCD camera 4, detects the hand of the user, and detects a size of the hand of the user P in addition to the position of the hand of the user P.

The control part 10 references the size table (see FIG. 6), and decides the size of the tracking virtual keyboard 8 based on the size of the hand of the user P (step S62). Then, the control part 10 executes display setting of the tracking virtual keyboard 8 which tracks the hand of the user P (step S63). The control part 10 sets the display of the tracking virtual keyboard 8 when the tracking virtual keyboard 8 is not being displayed, and sets the movement of the tracking virtual keyboard 8 when the tracking virtual keyboard 8 set in a fixing mode is being displayed.

The control part 10, as a result of the display setting, outputs a K/B display request to the control box 150 in the above-mentioned step S19. The K/B display request contains the size of the tracking virtual keyboard 8, position coordinates of the tracking virtual keyboard 8 corresponding to the position of the wrist of the user P and the like. Due to such outputting of the K/B display request, in the control box 150, image data for displaying the tracking virtual keyboard 8 is generated and is outputted to the controller 3.

That is, based on the size of the hand of the user P detected in step S62 and the size table stored in the flash ROM 16, the control part 10 selects a size of the tracking virtual keyboard 8 corresponding to the size of the hand of the user P.

The control part 10 may be configured to display the tracking virtual keyboard 8 which contains the previous page key 8c and the next page key 8d when the K/B display key 7a is operated one time. The control part 10 may be configured to display the tracking virtual keyboard 9 which contains a numerical keypad 9e when the K/B display key 7a is operated twice.

Further, the control part 10 displays the tracking virtual keyboard 8 set in a tracking mode at an uppermost layer thus detecting an operation by priority. That is, when a plurality of virtual operation panels (virtual menu bar 7 and tracking virtual keyboards 8, 9) is set at a position in an overlapping manner, the control part 10 sets the latest selected tracking virtual keyboard which tracks the position of the hand of the user P by priority out of the plurality of these overlapping virtual operation panels. When this processing is finished, the control part 10 finishes this subroutine.

In step S71 shown in FIG. 11, the control part 10, based on the position coordinates of the operated acceleration sensor 5, determines whether or not the operation inputting key (for example, previous page key 8c, next page key 8d or the like) of the tracking virtual keyboard 8 set in a tracking mode is selected.

When the control part 10 determines that the operation inputting key is selected (step S71: YES), the control part 10 performs setting for outputting a signal generated by the operation inputting key to the control box 150 (step S72) and finishes this subroutine. On the other hand, when the control part 10 determines that the operation inputting key is not selected (step S71: NO), the control part 10 advances the processing to step S73.

In step S73, the control part 10 determines whether or not the K/B non-display key 8b is selected out of the tracking virtual keyboards 8 which can be tracked based on the position coordinates of the operated acceleration sensor 5. When the control part 10 determines that the K/B non-display key 8b is selected (step S73: YES), the control part 10 performs setting for erasing the tracking virtual keyboard 8 having the selected K/B non-display key 8b (step S74).

The control part 10, as a result of erasing setting, outputs a K/B display erasing request to the control box 150 in the above-mentioned step S19. The K/B display erasing request includes information indicative of erasing of the display of the tracking virtual keyboard 8 and the like. Due to such outputting of the K/B display erasing request, in the control box 150, image data from which the display of the tracking virtual keyboard 8 is erased is generated, and is outputted to the controller 3. When this processing is finished, the control part 10 finishes this subroutine.

On the other hand, when the control part 10 determines that the K/B non-display key 8b is not selected (step S73: NO), the control part 10 advances the processing to step S75.

In step S75, the control part 10, based on position coordinates of the operated acceleration sensor 5, determines whether or not the K/B fixing/tracking key 8a is selected out of the tracking virtual keyboards 8 which can be tracked. The control part 10, when it is determined that the K/B fixing/tracking key 8a is selected (step S75: YES), performs setting for fixing the tracking virtual keyboard 8 provided with the selected K/B fixing/tracking key 8a based on the current reference coordinates of the hand of the user P (step S76), and finishes this subroutine. On the other hand, the control part 10, when it is determined that the K/B fixing/tracking key 8a is not selected (step S75: NO), finishes this subroutine.

By allowing the tracking virtual keyboard 8 to move while tracking the hand of the user P in this manner, it is possible to prevent the displacement between the display position of the tracking virtual keyboard 8 and the operation position of the user P. Accordingly, the user P can stably and surely operate the HMD by freely moving his head or hand during the operation without being forced to fix his head or hand during the operation.

Further, the position of the tracking virtual keyboard 8 can be fixed without allowing the tracking virtual keyboard 8 to track the position of the hand of the user P in response to a predetermined operation of the user P such as the operation of the K/B fixing/tracking key 8a. Accordingly, the unnecessary tracking virtual keyboard 8 can be fixed without allowing the tracking virtual keyboard 8 to track the hand of the user P and hence, it is possible to enhance the operability of the HMD 1 thus facilitating an operation of the HMD 1.

Further, the control part 10 makes a decision for setting the display of the tracking virtual keyboard 8 valid or invalid in response to a predetermined operation of the user P such as an operation of the K/B non-display key 8b. Here, the tracking virtual keyboard 8 which is set valid is displayed, and the tracking virtual keyboard 8 which is set invalid is not displayed.

By not displaying the tracking virtual keyboard 8 which is not necessary in this manner, the visibility can be enhanced thus facilitating the operation of the HMD 1.

[Application]

Figure 13:
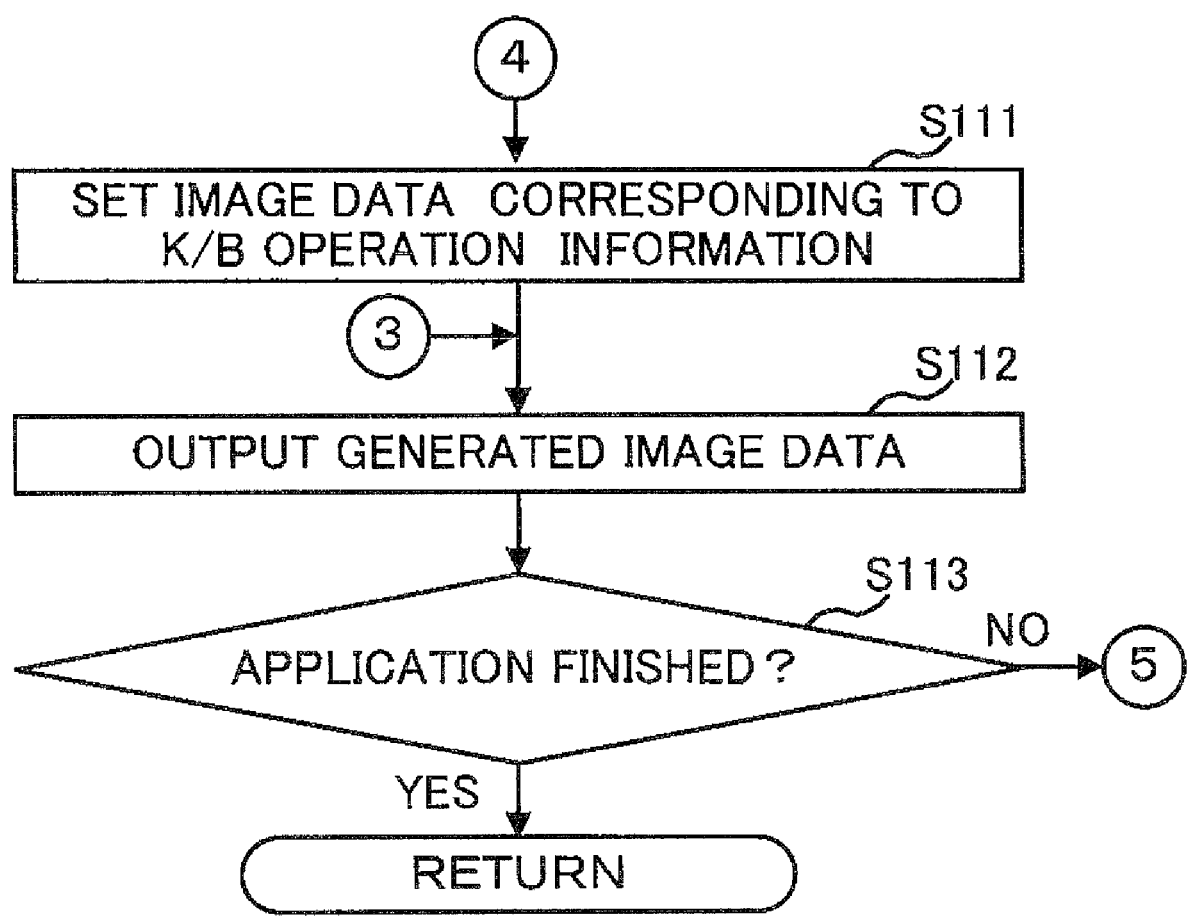
FIG. 13 is a flow chart showing one example of processing which is executed in performing the control of the HMD.

The application executed in the control box 150 is explained in conjunction with FIG. 12 and FIG. 13.

Firstly, as shown in FIG. 12, the control part 160 of the control box 150 executes initial setting (step S101). In this processing, the control part 160 executes initial setting such as RAM access permission and initializing of a working area. When this processing is finished, the control part 160 advances processing to step S102.

In step S102, the control part 160 determines whether or not a signal is inputted to the control part 160 from the controller 3 through the communication I/F controller 170. In this processing, the control part 160 determines whether or not a signal such as a signal indicative of a request of an image or a signal indicative of an action is inputted to the control part 160 from the controller 3.

When the control part 160 determines that the signal is inputted to the control part 160 (step S102: YES), the control part 160 advances the processing to step S103. On the other hand, when the control part 160 determines that the signal is not inputted to the control part 160 (step S102: NO), the control part 160 executes the processing in step S102 again and determines whether or not the signal is inputted to the control part 160 again.

In step S103, the control part 160 determines whether or not received signal inputting is a request for an image. In this processing, when the control part 160 determines that the received signal inputting is the request for an image (step S103: YES), the control part 160 advances the processing to step S104. On the other hand, when the control part 160 determines that the received signal inputting is not the request for an image (step S103: NO), the control part 160 advances the processing to step S105.

In step S104, the control part 160 generates request image data corresponding to the request for an image and sets the request image data in the RAM 168. When this processing is finished, the control part 160 advances the processing to step S113 shown in FIG. 13.

In step S105, the control part 160 determines whether or not received signal inputting is a request for a KB display. In this processing, when the control part 160 determines that the received signal inputting is the request for a KB display (step S105: YES), the control part 160 advances the processing to step S106. On the other hand, when the control part 160 determines that the received signal inputting is not the request for a K/B display (step S105: NO), the control part 160 advances the processing to step S107.

In step S106, the control part 160 defines a position where the tracking virtual keyboard 8 is displayed in the display area 6 of the HMD body 2 based on positional information contained in the request for a K/B display. Thereafter, the control part 160 generates image data for displaying the tracking virtual keyboard 8 at the defined position, and sets the image data in the RAM 168. When this processing is finished, the control part 160 advances the processing to step S113 shown in FIG. 13.

In step S107, the control part 160 determines whether or not received signal inputting is a request for K/B display position movement. In this processing, when the control part 160 determines that the received signal inputting is the request for K/B display position movement (step S107: YES), the control part 160 advances the processing to step S108. On the other hand, when the control part 160 determines that the received signal inputting is not the request for K/B display position movement (step S107: NO), the control part 160 advances the processing to step S109.

In step S108, the control part 160, based on positional information contained in the K/B display position movement request, defines a position in the display area 6 of the HMD body 2 where the moved tracking virtual keyboard 8 is displayed. Thereafter, the control part 160 generates image data for displaying the tracking virtual keyboard 8 at the defined position, and sets the image data in the RAM 168. When this processing is finished, the control part 160 advances the processing to step S113 in FIG. 13.

In step S109, the control part 160 determines whether or not received signal inputting is a K/B display erasing request. In this processing, when the control part 160 determines that the received signal inputting is the K/B display erasing request (step S109: YES), the control part 160 advances the processing to step S110. On the other hand, when the control part 160 determines that the received signal inputting is not the KB display erasing request (step S109: NO), the control part 160 advances the processing to step S111 in FIG. 13.

In step S110, the control part 160 generates image data without the tracking virtual keyboard 8 in the display area 6 of the HMD body 2 and sets the image data in the RAM 168. When this processing is finished, the control part 160 advances the processing to step S113 in FIG. 13.

In step S111 in FIG. 13, the control part 160 determines that received signal inputting is K/B operation information, generates image data having content corresponding to the K/B operation information, and sets the image data in the RAM 168. For example, when the K/B operation information is operation information on the next page key 8d, the control part 160 generates the image data of the next page of the currently displaying content image. On the other hand, when the K/B operation information is operation information on the previous page key 8c, the control part 160 generates the image data of the previous page of the currently displaying content image. When this processing is finished, the control part 160 advances the processing to step S112.

In step S112, the control part 160 outputs the image data generated in the above-mentioned manner and set in the RAM 168 to the controller 3 through the communication I/F controller 170. When this processing is finished, the control part 160 advances the processing to step S113.

In step S113, the control part 160 determines whether or not the application is finished corresponding to the various operations or the like. When the control part 160 determines that the application is finished (step S113: YES), the control part 160 finishes the application. On the other hand, when the control part 160 determines that the application is not finished (step S113: NO), the control part 160 returns the processing to step S102. Due to such processing, the control part 160 executes the processing in step S101 to step S112 until the application is finished.

In this manner, the control part 160 in the control box 150 generates the image data corresponding to the signal from the controller 3 and outputs the image data to the controller 3 thus controlling the image to be displayed in the display area 6 of the HMD body 2.

[Other Variations]

In the above-mentioned embodiment, the explanation has been made with respect to the case where the operation conducted by the finger of the user P is detected by the acceleration sensor 5 mounted on the finger of the user P. However, a part which detects the operation conducted by the finger of the user P is not limited to the acceleration sensor 5. For example, the control part 10 may detect the operation conducted by the finger of the user P based on a result of analysis of an image imaged by the CCD camera 4 which constitutes the imaging unit. That is, the control part 10 which performs such processing functions as an operation detection unit 212. By detecting an operation conducted by the finger of the user P based on the result of the analysis of the imaged image, the acceleration sensor or the like becomes unnecessary thus simplifying the constitution of the HMD 1.

In the above-mentioned embodiment, when the hand of the user P falls within an imaging range of the CCD camera 4, the tracking virtual keyboard 8 set in a tracking mode is displayed, while when the hand of the user P is out of the imaging range, the tracking virtual keyboard 8 set in a tracking mode is not displayed. However, the present invention is not limited to such a display control. For example, even when the hand of the user P projects from the imaging range, the tracking virtual keyboard 8 set in a tracking mode may be displayed for a predetermined time (for example, 1 minute) or until the K/B non-display key 8b is operated. Further, the tracking virtual keyboard 8 may not be displayed unless a predetermined time elapses even when the hand of the user falls within the imaging range of the CCD camera 4 from the outside of such an imaging range.

In setting the tracking virtual keyboard 8 set in a tracking mode and in a fixing mode, a distance from the tracking virtual keyboard 8 set in a fixing mode to the hand of the user P is counted, and setting of the tracking virtual keyboard 8 is changed from a fixing mode to a tracking mode when a result of counting is within a predetermined range. However, the setting change of the tracking virtual keyboard 8 is not limited to the above-mentioned setting. For example, setting of the tracking virtual keyboard 8 may be changed from a fixing mode to a tracking mode in response to a selection operation in the vicinity of the K/B fixing/tracking key 8a. That is, the control part 10 determines whether or not an operation which allows the position of the tracking virtual keyboard 8 to track the position of the hand of the user P is executed based on the operation conducted by the finger detected by the acceleration sensor 5.

Further, in the above-mentioned embodiment, the virtual menu bar 7 for selecting the tracking virtual keyboard 8 is displayed in the display area 6. However, the present invention is not limited to such a display control. For example, the virtual menu bar 7 is not displayed in the display area 6, instead a physical operation part may be additionally provided for displaying and selecting the tracking virtual keyboard 8.

In the above-mentioned embodiment, the plural kinds of tracking virtual keyboards 8 are made displayable in the display area 6 simultaneously. However, the present invention is not limited to such a display control. For example, only one kind of tracking virtual keyboard may be displayable at a time.

In the above-mentioned embodiment, the control part 10 measures the distances to the respective finger tips using the position of the wrist of the hand of the user P as the reference coordinates, and recognizes the size of the hand of the user P based on the result of the measurement. However, the present invention is not limited to such a recognition control. For example, the control part 10 may measure distances to respective fingers using the position of a certain finger such as a thumb out of the hand of the user P as the reference coordinates, and may recognize the size of the hand of the user P based on a result of the measurement. Further, for example, the control part 10 may measure a distance to a specified finger (for example, a middle finger) out of respective fingers of the user P as the reference coordinates, and may recognize the size of the hand of the user P based on a result of the measurement.

Further, in the above-mentioned embodiments, the size of the tracking virtual keyboard 8 is decided based on the size of the hand of the user P and the size table. However, the present invention is not limited to such a decision control. For example, a size of the tracking virtual keyboard 8 may be induced by computation corresponding to a size of the hand of the user P. Further, an aspect ratio of the tracking virtual keyboard 8 may be fixed or may be changeable corresponding to setting. A size of the tracking virtual keyboard 8 may not be changeable.

In the above-mentioned embodiment, the HMD body 2, the controller 3 and the control box 150 are formed as separate bodies respectively. However, the present invention is not limited to such a constitution. For example, the controller 3 and the control box 150 may be integrally formed or the HMD body 2 and the controller 3 may be integrally formed.

All of these parts may be integrally formed or may be formed as separate bodies.

Although several embodiments of the present invention have been explained in detail in conjunction with the drawings heretofore, these embodiments merely constitute examples, and the present invention can be carried out in other modes to which various modifications and improvement are applied based on knowledge of those who are skilled in the art.

What is claimed is:

1. A head mount display comprising:
a display unit which is configured to transmit an ambient light therethrough, and configured to project an image light corresponding to image data onto an eye of a user in order to allow the user to observe an image corresponding to the image light;
an imaging unit which is configured to image at least a portion of a field of view of the user;
an image analyzing unit which is configured to analyze an image imaged by the imaging unit;
a hand detection unit which is configured to detect a hand of the user based on a result of an analysis performed by the image analyzing unit;
a position definition unit which is configured to define a display position to display a selected virtual operation panel which is selected by the user from a plurality of virtual operation panels such that the selected virtual operation panel moves on the screen coextensively with movement of the hand of the user which is observed by the user through the display unit;
a display control unit which is configured to control the display unit such that the display unit displays the selected virtual operation panel at the display position;
an operation detection unit which is configured to detect an operation conducted by a finger of the user;
an operation determination unit which is configured to determine whether or not the selected virtual operation panel is operated based on the operation conducted by the finger detected by the operation detection unit; and
an operation control unit which is configured to perform a control corresponding to an operation position on the selected virtual operation panel when the operation determination unit determines that the selected virtual operation panel is operated,
wherein the position definition unit defines a first specified portion of the hand of the user as a reference position based on a position of the hand of the user detected by the hand detection unit, and the position definition unit defines the display position for the selected virtual operation panel and assumes a predetermined positional relationship between the reference position and the display position, arranges the display position in a display area displayed by the display unit and the position definition unit fixes a secondary display position of each non-selected virtual operation panel while not allowing each non-selected virtual operation panel to move on the screen coextensively with the movement of the position of the hand of the user.

2. The head mount display according to claim 1, wherein the hand detection unit is further configured to detect a size of the hand of the user,
wherein the head mount display further comprises a size selection unit which is configured to select a size of the selected virtual operation panel based on the size of the hand of the user detected by the hand detection unit, and
wherein the position definition unit is configured to define the display position of the selected virtual operation panel based on the size of the selected virtual operation panel selected by the size selection unit.

3. The head mount display according to claim 2, wherein the head mount display further comprises a size memory unit in which size information where the size of the hand of the user and the size of the selected virtual operation panel corresponding to the size of the hand of the user are associated with each other is stored, and
the size selection unit is configured to select the size of the selected virtual operation panel based on the size of the hand of the user detected by the hand detection unit and the size information stored in the size memory unit.

4. The head mount display according to claim 1, wherein the head mount display includes a display definition unit which is configured to make a decision for setting a display of the selected virtual operation panel valid or invalid in response to a predetermined operation detected by the operation detection unit, and
the display control unit controls the display unit such that the display unit displays the selected virtual operation panel which is set valid by the display definition unit, and such that the display unit prevents the display unit from displaying the selected virtual operation panel which is set invalid by the display definition unit.

5. The head mount display according to claim 4, wherein the head mount display further comprises a focal point setting unit which is configured to set a focal length of the imaging unit to a specified focal length when the selected virtual operation panel is set valid by the display definition unit.

6. The head mount display according to claim 1, wherein the position definition unit further fixes the position of the selected virtual operation panel without allowing the selected virtual operation panel to move on the screen coextensively with movement of the position of the hand of the user in response to a predetermined operation detected by the operation detection unit.

7. The head mount display according to claim 6, wherein the position definition unit, in a state that the secondary display position of each non-selected virtual operation panel is fixed, sets a predetermined virtual operation panel whose display position is fixed as the selected virtual operation panel which moves on the screen coextensively with movement of the position of the hand of the user when the position of the hand of the user detected by the hand detection unit falls within a predetermined distance from the position of the predetermined virtual operation panel.

8. The head mount display according to claim 1, wherein the head mount display includes a position setting unit which is configured to set a selection-use virtual operation panel at a predetermined display position, and the selection-use virtual operation panel is to select the selected virtual operation panel for moving on the screen coextensively with movement of the hand of the user from the plurality of virtual operation panels, and
the display control unit controls the display unit to display the selection-use virtual operation panel.

9. The head mount display according to claim 1, wherein the operation detection unit is an acceleration sensor which is mounted on a finger of the user and detects an operation conducted by the finger of the user.

10. The head mount display according to claim 1, wherein the operation detection unit detects an operation conducted by the finger of the user based on a result of an analysis performed by the image analyzing unit.

11. The head mount display according to claim 1, wherein the first specified portion of the hand of the user is on a wrist of the user.

* * * * *